April 11, 1961 W. C. HARMON 2,979,196
AUTOMATIC PIPE COUPLING INSPECTOR
Filed June 20, 1955 17 Sheets-Sheet 1
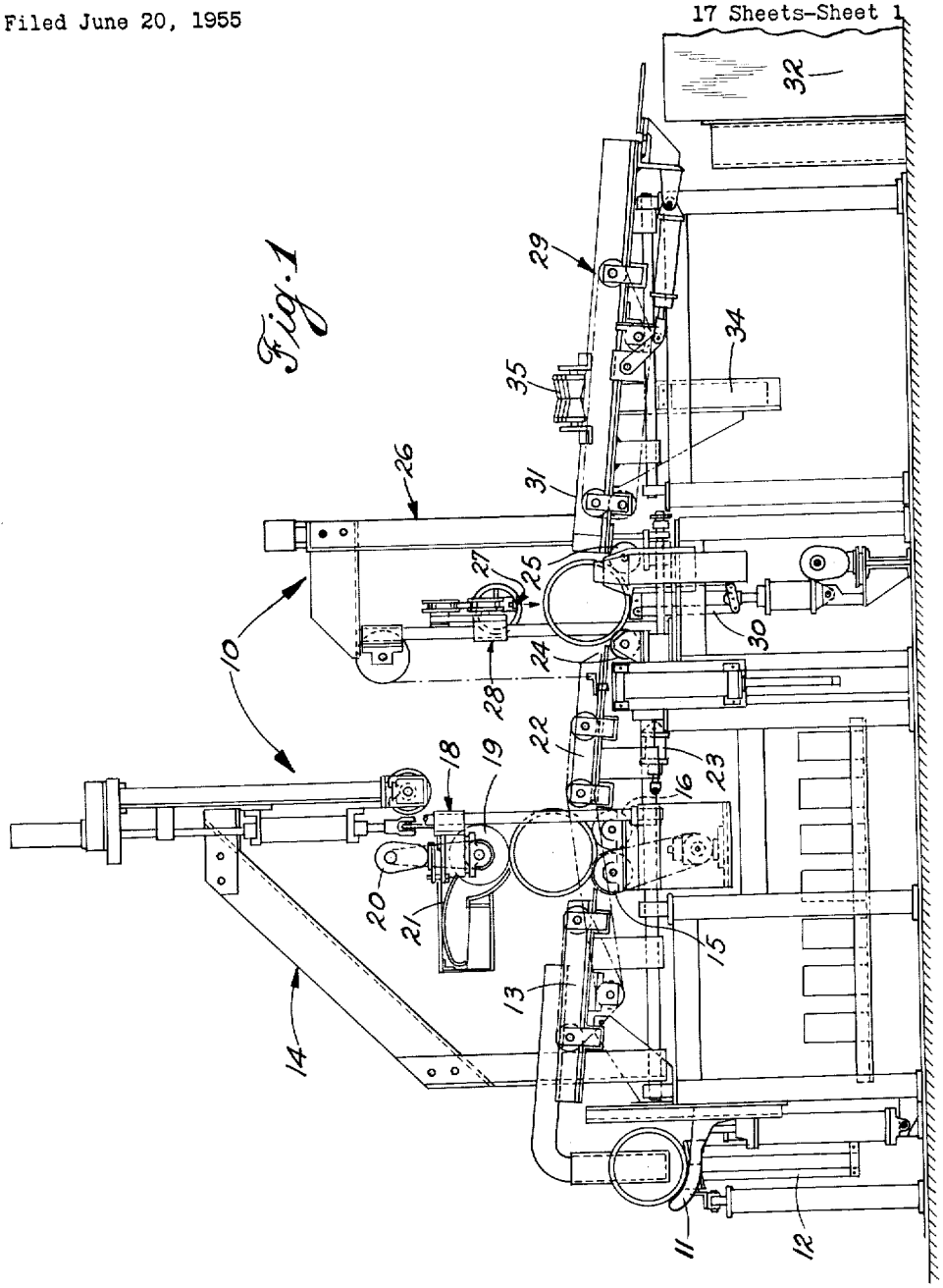
INVENTOR.
WILLIAM C. HARMON
BY
RICHEY, WATTS, EDGERTON & McNENNY
A. D. Watts
ATTORNEYS

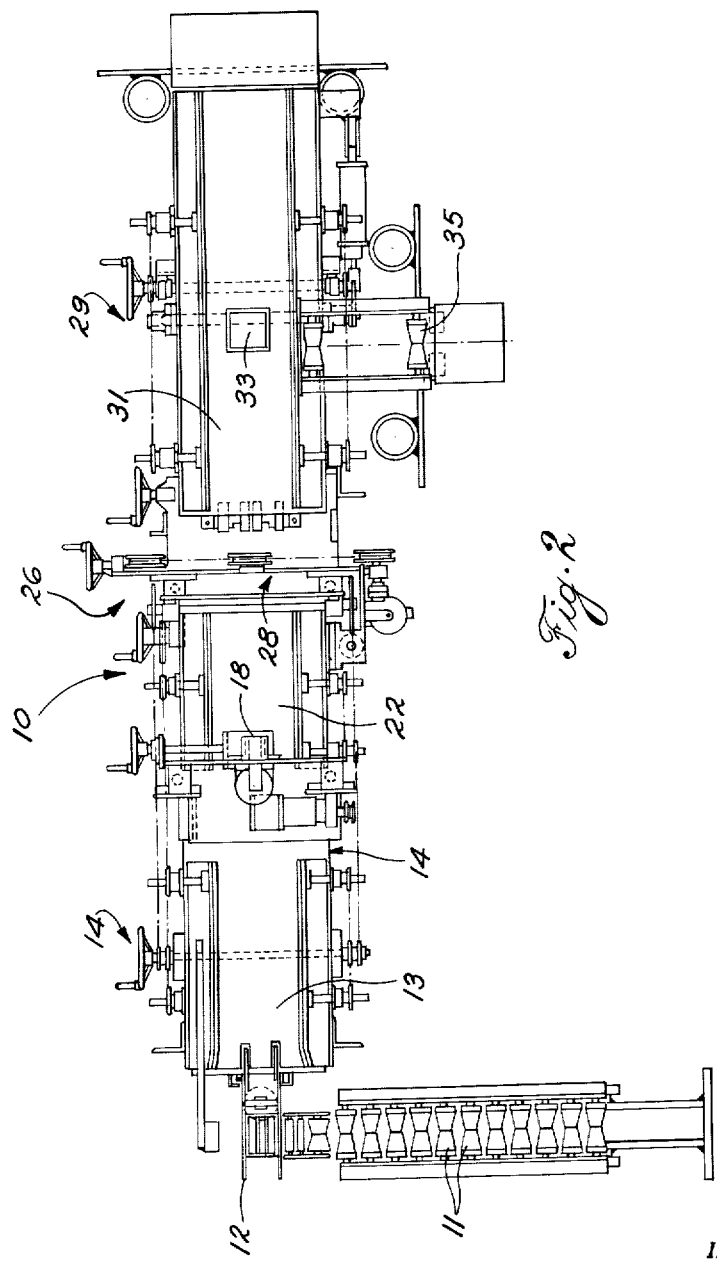

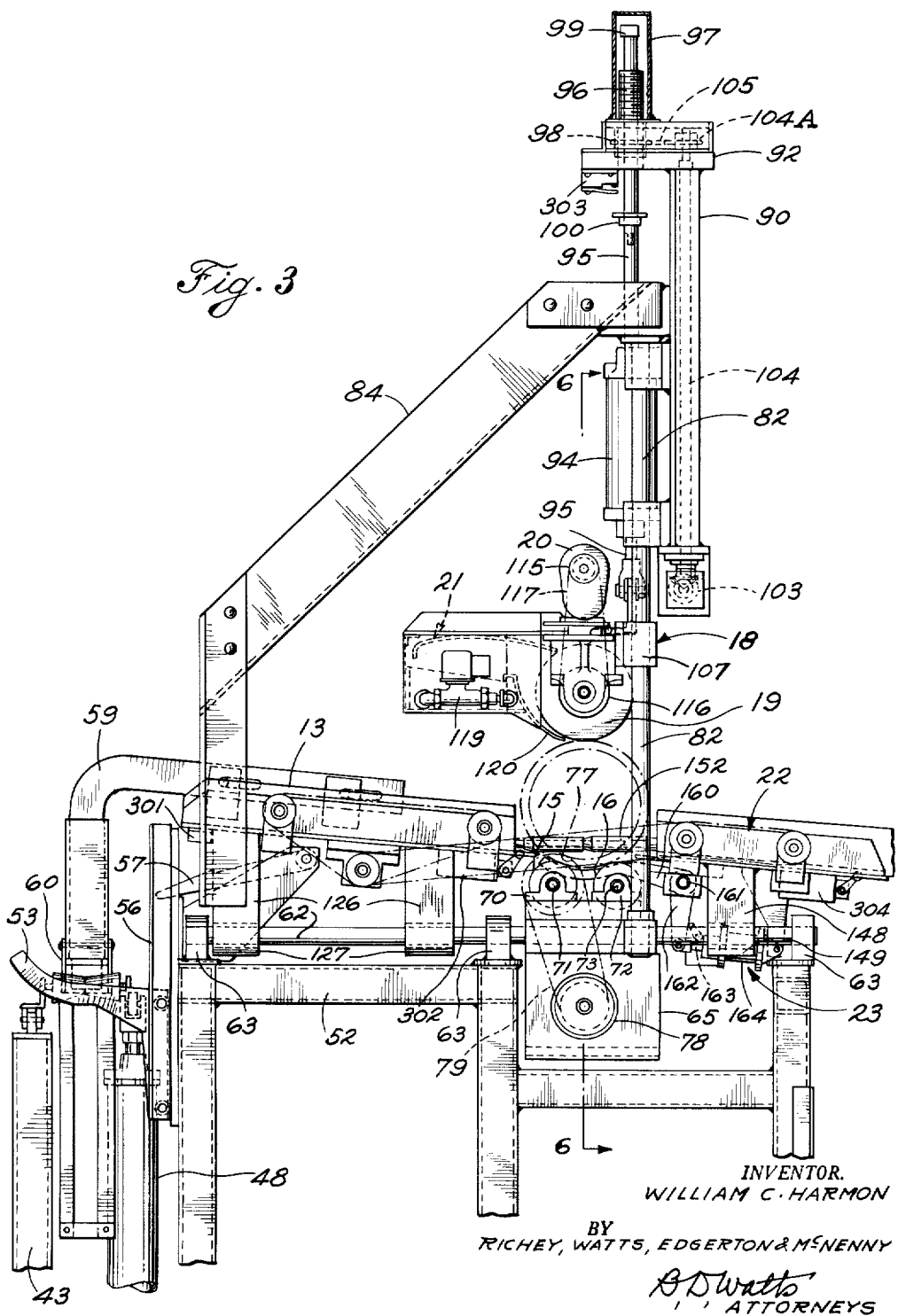

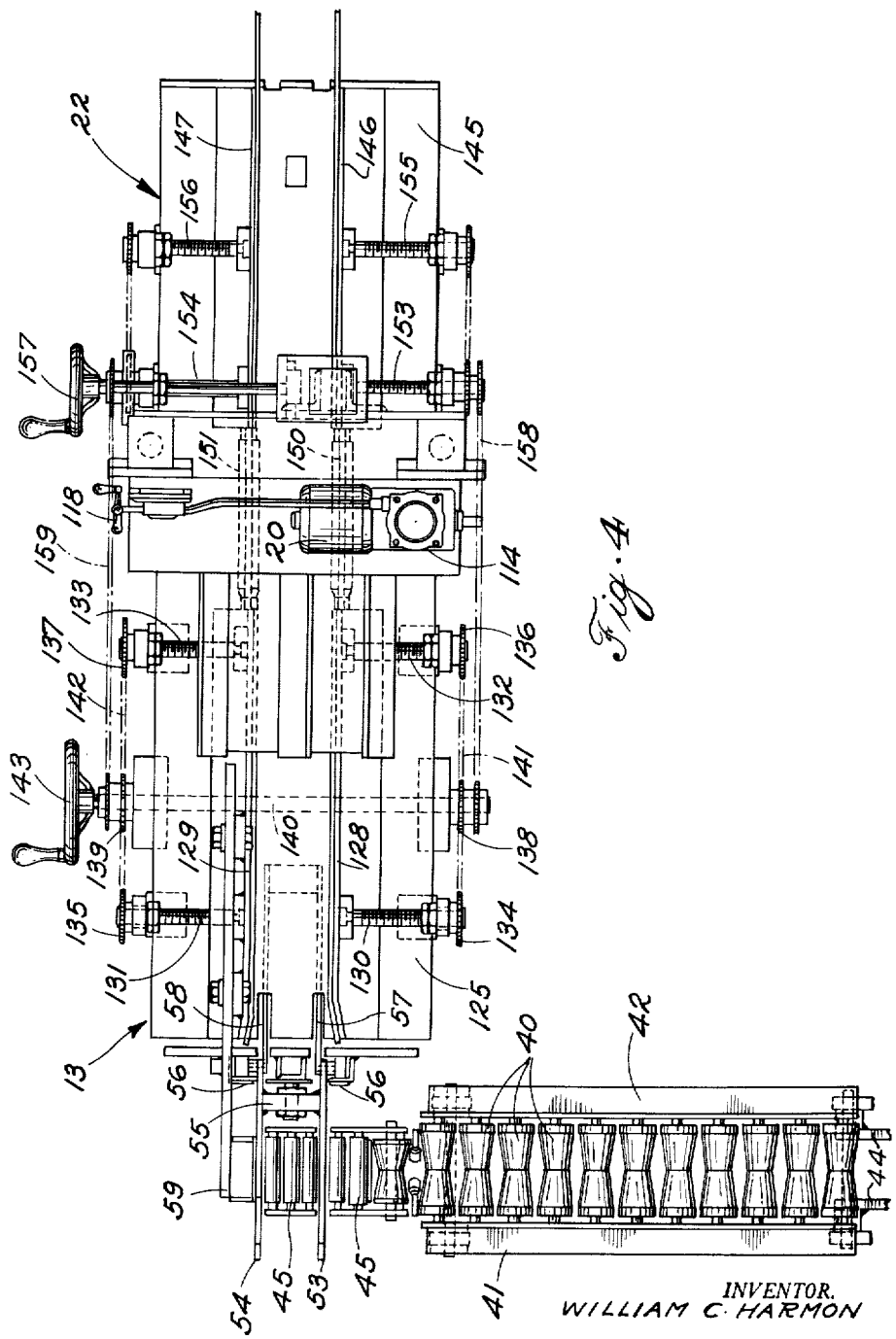

April 11, 1961 W. C. HARMON 2,979,196
AUTOMATIC PIPE COUPLING INSPECTOR
Filed June 20, 1955 17 Sheets-Sheet 5
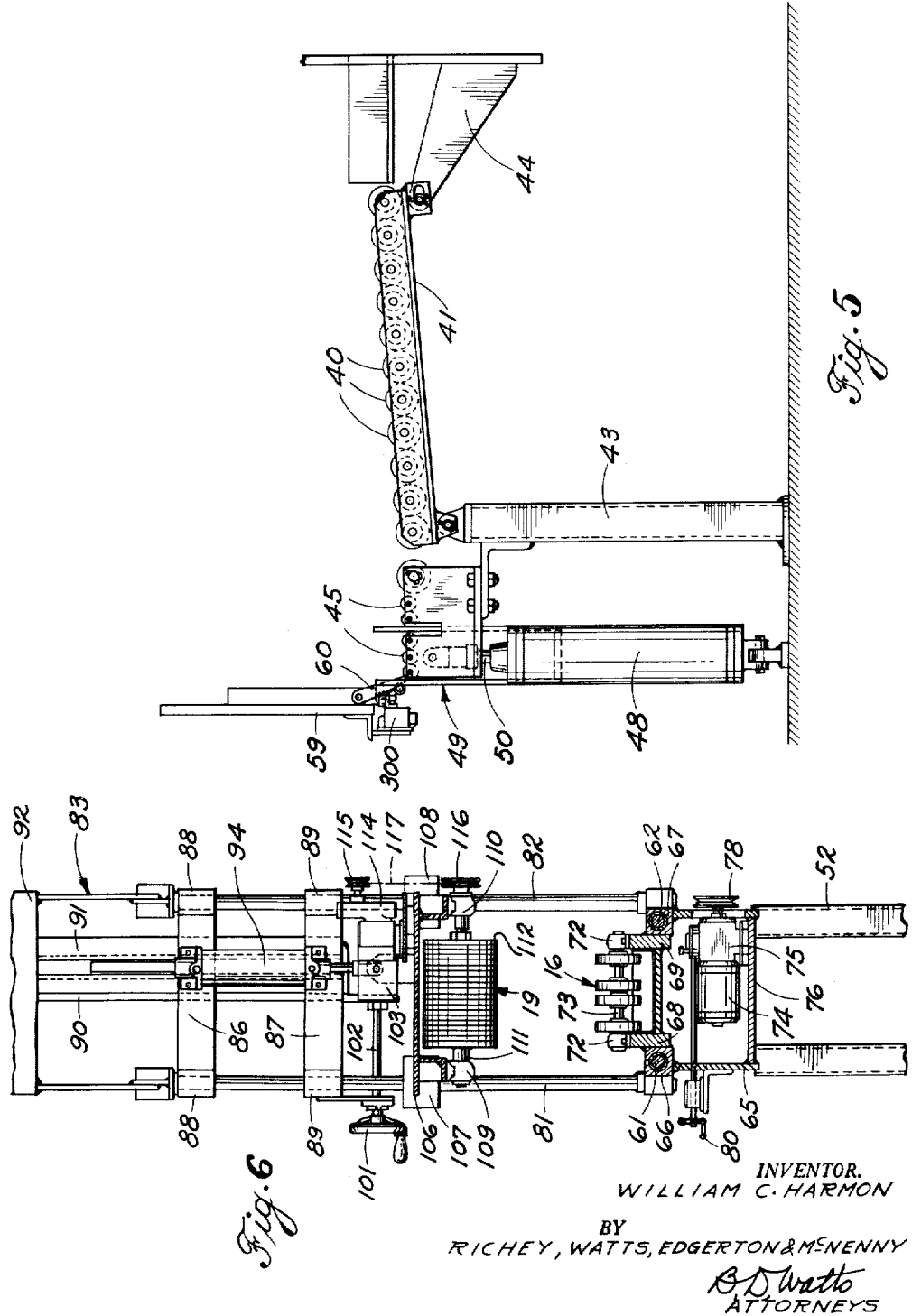

Fig. 7

INVENTOR.
WILLIAM C. HARMON
BY
RICHEY, WATTS, EDGERTON & McNENNY
ATTORNEYS

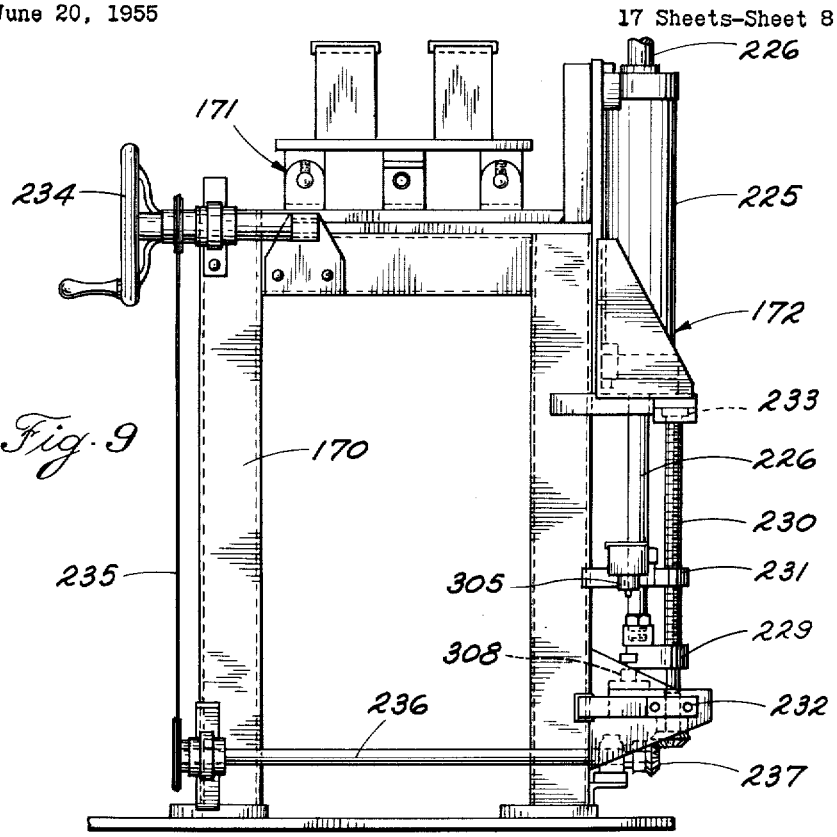
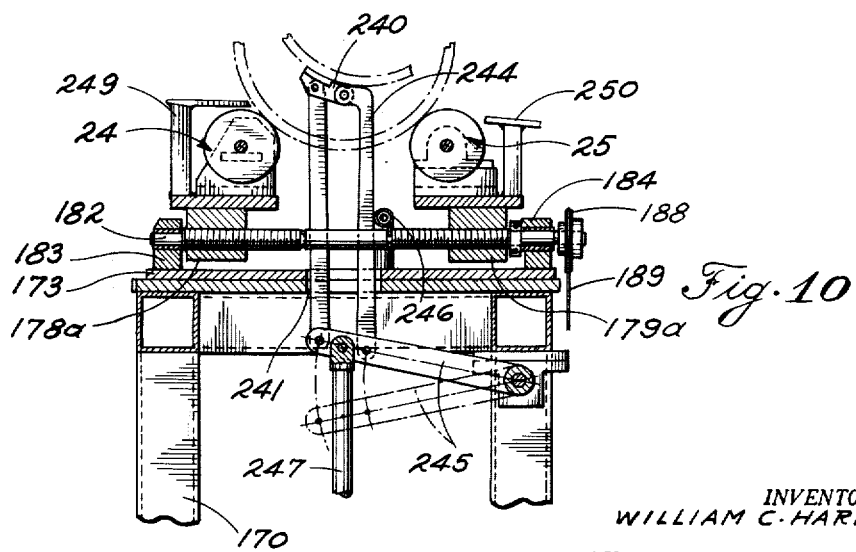

INVENTOR.
WILLIAM C. HARMON
BY
RICHEY, WATTS, EDGERTON & McNENNY
ATTORNEYS

INVENTOR.
WILLIAM C. HARMON

BY
RICHEY, WATTS, EDGERTON & McNENNY

ATTORNEYS

United States Patent Office 2,979,196
Patented Apr. 11, 1961

2,979,196

AUTOMATIC PIPE COUPLING INSPECTOR

William C. Harmon, Cleveland, Ohio, assignor to Republic Steel Corporation, Cleveland, Ohio, a corporation of New Jersey Filed June 20, 1955, Ser. No. 516,402

49 Claims. (Cl. 209—3)

This invention relates generally to article assorting devices and, more particularly, to an apparatus for automatically inspecting pipe couplings to determine the presence of flaws and for separating the imperfect couplings from the good couplings.

A general object of the invention is to provide a machine which will automatically inspect and assort cylindrical metallic articles such as pipe couplings, according to the presence or absence of flaws in the body of the coupling.

Another object of the invention is to automatically deliver a cylindrical article to an inspecting device to inspect the article by performing electrical measurements to determine the condition thereof and then to pass or reject the article in accordance with the results of the measurements so made.

Still another object of the invention is to provide a machine which automatically performs all the operations incident to inspecting and assorting pipe couplings and which will do so without the intervention of a human operator.

In manufacturing pipe couplings of the type which are formed by threading the interior of a hollow cylindrical member, it is important that the finished coupling be free of all flaws or defects of the type which generally occur as a result of the forming operations, e.g., such as rolling, forging and the like. The product resulting from such operations may include seams, cracks, slivers or folds at the surface or immediately adjacent the surface of the article. The presence of such defects or flaws in pipe couplings may be quite objectionable inasmuch as the couplings may be subjected to high internal pressures of longitudinal stresses. The quality requirements are particularly high in couplings which are utilized for oil well casings and pipe lines such as those which convey natural gas or oil.

In my U.S. Patent No. 2,660,704, issued November 24, 1953, and entitled "Seam Depth Indicator," there is described a testing apparatus for detecting the presence of flaws or imperfections, of the type referred to above, by measurements conducted at the surface of a steel billet. The apparatus therein described includes a high frequency oscillator for energizing a search coil to generate an electromagnetic field in the vicinity of the search coil. By bringing the search coil adjacent the billet to be tested, the reaction produced upon the search coil by the interaction of the billet with the electromagnetic field modifies the operation of the high frequency oscillator according to the chamber of the metal of the billet. The effect of the billet upon the performance of the oscillator as the search coil is moved over the surface of the billet thus provides a measure of the presence or absence of flaws in the billet.

In the testing apparatus referred to above, it is necessary that the search coil be moved over the billet by a human operator who observes an indicating device such as a neon lamp or a meter. The changes in the indicating device which occur as the search coil is moved over the billet enable the operator to determine whether the billet under inspection should remain in the processing line or be removed from the line and returned to the furnace as scrap. Such procedure, is, of course, suitable where small numbers of large pieces of relatively high unit value are involved, but it is not at all suitable where large numbers of small pieces having a relatively low unit value are involved.

Accordingly, I have devised an automatic machine wherein apparatus of the type referred to above may be utilized to determine the presence or absence of flaws such as cracks, seams, laps, breaks, or slivers in pipe couplings. The machine of the invention comprises novel apparatus for conveying pipe couplings in rapid succession to an inspecting device which includes a search coil and associated apparatus and moves the pipe coupling relativel to the search coil and the search coil relative to the pipe coupling, so that the entire surface and the ends of the coupling are traversed by the search coil. The apparatus removes each coupling from the inspecting device after the inspection operation is completed and then separates the couplings according to the inspection operation which has determined whether the couplings are acceptable or defective.

As will be understood from the following description, the machine is completely automatic and functions continuously without the human operator heretofore considered necessary in inspecting articles by means of electrical measurements of this kind.

The features of the invention are pointed out with particularity in the appended claims. The invention together with the objects and advantages thereof may be better understood by reference to the following detailed description taken in connection with the accompanying drawings, in which:

Fig. 1 is an elevation view of the pipe coupling sorting machine of the invention taken from the back of the machine;

Fig. 2 is a plan view of the machine;

Fig. 3 is an enlarged elevation view of the cleaning apparatus of the machine;

Fig. 4 is a plan view showing particularly the feed conveyor and chutes for delivering the couplings to the cleaning machine and the chute for transferring the couplings from the cleaning machine to the inspecting machine;

Fig. 5 is an end view of the apparatus showing particularly the coupling elevator for feeding the pipe couplings from the conveyor to the cleaning machine;

Fig. 6 is an elevation view of the cleaning machine taken in the direction 6—6 in Fig. 3;

Fig. 7 is an elevation view of the inspecting machine taken from the back of the machine;

Fig. 9 is an enlarged view of the bottom portion of the inspecting machine and illustrating particularly the inspector head elevator and control mechanism;

Fig. 10 is a fragmentary view, partially in section, of a portion of the inspecting machine, showing particularly the coupling rolls and discharge elevator and taken in the direction 10—10 in Fig. 8;

Figure 8:
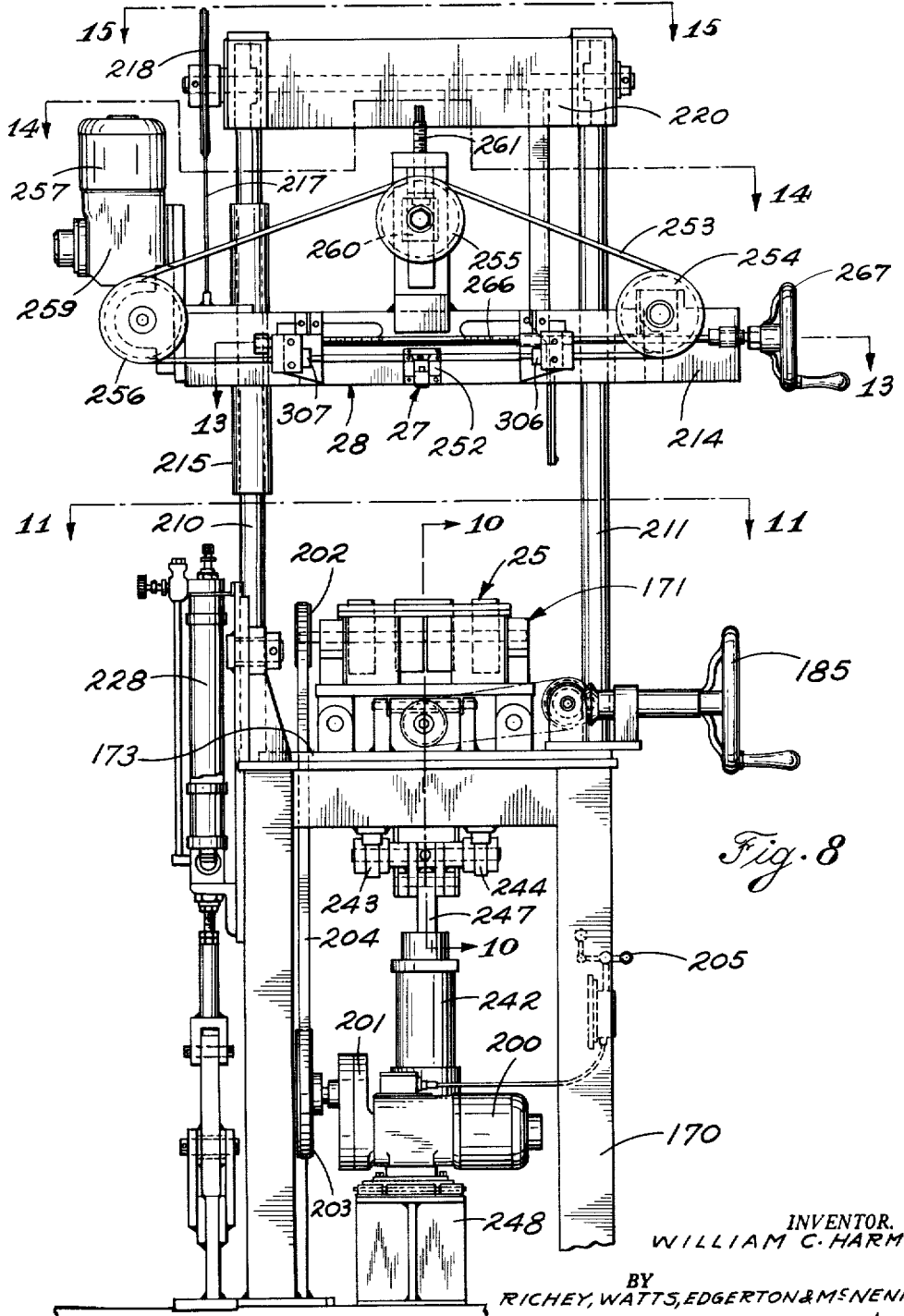
Fig. 8 is an elevation view of the inspecting machine taken from the discharge side thereof.

Referring now to Figs. 1 and 2, the sorting machine 10 is adapted to receive pipe couplings from a cut-off machine, automatically transfer the couplings through the sorting machine, while accomplishing the several functions of the machine, and deliver the couplings to one of two receptacles depending upon whether or not the coupling is acceptable or imperfect. Pipe couplings are delivered to a conveyor 11 and roll down the conveyor under the influence of gravity to a coupling elevator 12. As the coupling arrives in position on the elevator, it trips a switch which actuates the elevator to lift the coupling to a chute 13 of a cleaning machine 14. The coupling rolls down the chute 13 to a pair of cleaner rolls 15 and 16 which are driven to turn the coupling. A cleaner head 18 having a rotary cleaning brush 19 is lowered into position with the brush 19 engaging the outer surface of the coupling. The brush 19 is turned by a motor 20 so that the entire outer surface of the coupling is cleaned as it turns on the rolls 15 and 16. A spray device 21 sprays water or cleaning fluid upon the brush 19 each time, as a coupling enters the cleaner.

When the coupling has been cleaned, the cleaner head 18 is retracted and the coupling is lifted from the rolls 15 and 16 to a chute 22 by a kick-out device, shown partially at 23. The coupling rolls down the chute 22 to the rolls 24 and 25 of an inspecting machine 26 and is turned on the rolls 24 and 25, while the coupling is scanned by the detector head 27 of an electronic flaw detecting device carried by the inspector head 28. As the coupling drops onto the rolls 24 and 25, the inspector head is lowered from its normally retracted position to a position with the detecting device 27 engaged with the outer surface of the coupling. The device 27 is moved from one end of the coupling to the other in a prescribed fashion as the coupling is turned; and, when the far end of the coupling is reached, the inspector head 28 is retracted, and the coupling is lifted from the rolls 24 and 25 to a discharge table 29 by a discharge apparatus 30.

If the electronic detecting device indicates that the coupling is without flaws, the coupling rolls down the discharge chute 29 to a tote box 32. If, however, the coupling incorporates some imperfection, the inspection device causes a gate 33 to be lifted to stop the coupling over an elevator 34. The elevator 34 then lifts the defective coupling upward to a discharge conveyor 35 to discharge the defective coupling into a second tote box (not shown).

Referring now to Figs. 4 and 5, the conveyor 11 comprises a plurality of biconical rolls 40 which are carried by two spaced longitudinal frame members 41 and 42 supported at the cleaner machine end by two legs 43 and at the cut-off machine by a member 44. The legs 43 carry an assembly including three rolls 45 for holding the coupling in position over the elevator 12.

The elevator 12 includes a pneumatic cylinder 48 which functions as an actuator and has an elevator head 49 mounted at the top end of the piston rod 50. The elevator head 49 includes two spaced arms 53 and 54 which are supported by the cross member 55 to which the piston rod 50 is secured. The members 53 and 54 are normally disposed with the center part somewhat below the level of the rolls 40 and 45 and have the inner part slanted downward so that, when the elevator is raised to lift the coupling to the chute 13, the coupling will roll from the elevator to the chute. The coupling is carried upwardly by the members 53 and 54 with the coupling held at the outer extremity by the outer portions of the members 53 and 54 and with the inner extremity of the coupling bearing against two vertical slide members 56 until the coupling clears those members at the level of the chute 13. Two bridging members 57 and 58 are engaged by the elevator head 49 and carried upward to bridge the space between the members 53 and 54 and the bed of the chute 13.

The operation of the elevator 12 is controlled by an electrical switch 300 carried by an arm 59 mounted on the frame 52 of the cleaning machine. The switch is operated by a pivoted contactor member 60 which is engaged by the end of the coupling to actuate the switch as the coupling moves into position over the elevator arms 53 and 54.

Referring now to Figs. 3, 4 and 6, the frame 52 comprises six vertical columns, each of rectangular cross section, which are held together and braced by suitable longitudinal and transverse members. The frame 52 supports two laterally spaced cylindrical bars 61 and 62 which extend along the length of the frame and are carried by a plurality of collars 63. The collars 63 are welded to the frame 52 and hold the bars in position by means of suitable set screws. The bars 61 and 62 have their outer surfaces finished so that the apparatus which is mounted on the bars may be moved freely along the bars to position them for proper operation.

As shown particularly in Figs. 3 and 6, the cleaner rolls 15 and 16 are supported by a frame 65 which includes two longitudinal members 66 and 67 carried by the bars 61 and 62. The longitudinal members 66 and 67 support two vertical plates 68 and 69 which carry the bearings 70 for the shaft 71 of rolls 15 and the bearings 72 for the shaft 73 of the rolls 16. A drive motor 74 and a variable speed reducer 75 are supported from the bottom plate 76 of the frame 65. The shaft 71 is driven from the speed reducer 75 by two pulleys 77 and 78 and a belt 79. The speed reducer is adjusted by means of a handle 80.

The frame 65 and the longitudinal members 66 and 67 support two vertical ways 81 and 82 which carry the cleaner head 19. The upper end of the ways 81 and 82 are held by a U-shaped member 83 which is secured at the lower ends thereof to the upper ends of the ways 81 and 82. The entire assembly is held in a vertical position by two braces 84 and 85 which are held at the lower ends by the frame of the chute 13. Two transverse members 86 and 87 have collars 88 and 89 at the ends thereof carried on the ways 81 and 82. The transverse members 86 and 87 are held together by two angle pieces 90 and 91 which are welded to the transverse members 86 and 87 and to a head piece 92 which is carried by the U-shaped member 83.

The transverse members 86 and 87 support a pneumatic cylinder 94 which has the piston rod 95 thereof connected to the frame of the cleaner head 18 and serves as an actuator to lower the cleaner head into a cleaning position and retract the cleaner head from the cleaning position. The upper end of the piston rod extends through the member 92 and a threaded sleeve 96 into the cylindrical member 97 mounted at the top of the member 92. The threaded sleeve 96 is moved up and down by a sprocket 98 which is mounted on suitable bearings (not shown) so that, when the sprocket 98 is turned, the sleeve 96 is raised or lowered. A cap 99 at the top of the piston rod 95 is arranged to abut the upper end of the sleeve 96 so that downward travel of the piston rod 95 and, hence of the cleaner head 18, is limited without affecting the height to which the cleaner head is retracted. The piston rod carries a collar 100 for actuating switch 303 at the upper limit of its travel as is hereinafter described.

The sprocket 98 is turned by an adjusting hand wheel 101 which is mounted on the lower transverse member 87. The hand wheel 101 is carried by a shaft 102 and is connected to a right-angle coupling 103 which is mounted at the lower end of the vertical members 90 and 91. A shaft 104 extends vertically between the members 90 and 91 from the right-angle coupling 103 to a sprocket 104A which is coupled to the sprocket 98 by means of a chain 105.

The cleaner head 18 has a frame 106 which includes two collars 107 and 108 on the vertical ways 81 and 82. The frame is supported by the piston rod 95 of the air cylinder 94. The frame 106 carries two bearings 109 and 110 for the shaft 111 of the cleaner brush 112 and the motor 20 and variable speed reducer 114 for driving the brush. The speed reducer 114 is coupled to the shaft 111 by means of pulleys 115 and 116 and a V-belt 117. The speed reducer is adjusted by means of a handle.

The cleaner head 18 carries a water ejector 21 which is supplied with water through a solenoid valve 119. An air nozzle 120 is provided for blowing the dirt from the coupling as it is loosened by the brush 19.

The chute 13 is supported upon the ways 61 and 62 to permit longitudinal adjustment of the chute with respect to the cleaner rolls 15 and 16 and the head 18. The chute 13 comprises a bed plate 125 which is supported from the way 62 by two downwardly projecting members 126 and 127 and from the way 61 by similar vertical members and collars (not shown). The bed 125 is supported from the ways at an angle such that the coupling will roll from the feed end to the rolls 15.

The chute includes two sides boards 128 and 129 which are held by four screw positioning devices 130 and 131 and 132 and 133. Each of the devices 130 to 133, inclusive, comprises a threaded shaft which has its inner end received in a suitable restraining member (shown in dotted outline) affixed to the side board and threaded through a fixed nut which is supported from the bed 125. Sprocket wheels 134 and 135, and 136 and 137 are secured to the threaded shafts and connected to the sprocket wheels 138 and 139 of a main shaft 140 by means of sprocket chains 141 and 142. The threads of the corresponding opposite shafts are oppositely threaded so that as the hand wheel 143 is turned, the side boards are moved toward or away from each other by equal amounts to accommodate couplings of various lengths.

The chute 22 is generally similar to chute 13 and includes a bed 145 and two side boards 146 and 147. The bed 145 is supported from the ways 62 by a vertical member 148 and collar 149 and from the way 61 by a similar member and collar (not shown) in the same fashion as chute 13. The feed end of the chute 22 is held to the delivery end of the chute 13 by two adjoining screws 150 and 151, each having two fixed parts and an adjusting part such as the part 152 for the screw 150. The side boards 146 and 147 are made adjustable by four adjusting devices 153 and 154 and 155 and 156 which are coupled to an adjusting handle 157. The hand wheels 143 and 157 are coupled by suitable chains 158 and 159 and associated sprocket wheels so that all the side boards can be adjusted simultaneously from either operating position.

The bed plate 125 of chute 13 supports two switches 301 and 302 and the bed plate 145 of chute 22 supports a switch 304 for controlling the operation of the actuators of the cleaning machine 14 and the inspecting machine 26 as is hereinafter described. Each of the switches includes an actuating lever which projects upward through an opening in the bed plate so that, as a coupling rolls down the chute, the lever is engaged by the coupling and momentarily actuates the switch.

The coupling kick-out device 23 includes two curved arms, of which one arm 160 is shown in Fig. 3, pivoted upon a shaft 161 which is supported from the underside of the bed 145. A bell crank 162 secured to the shaft 161 and arm 160 is connected to the piston rod 163 of an air cylinder 164, which serves as an actuator for the kick-out device. When the air cylinder 164 is operated, the arms 160 and its associated arm lift the coupling from the rolls 15 and 16 to the feed end of the chute 22.

Figure 7:
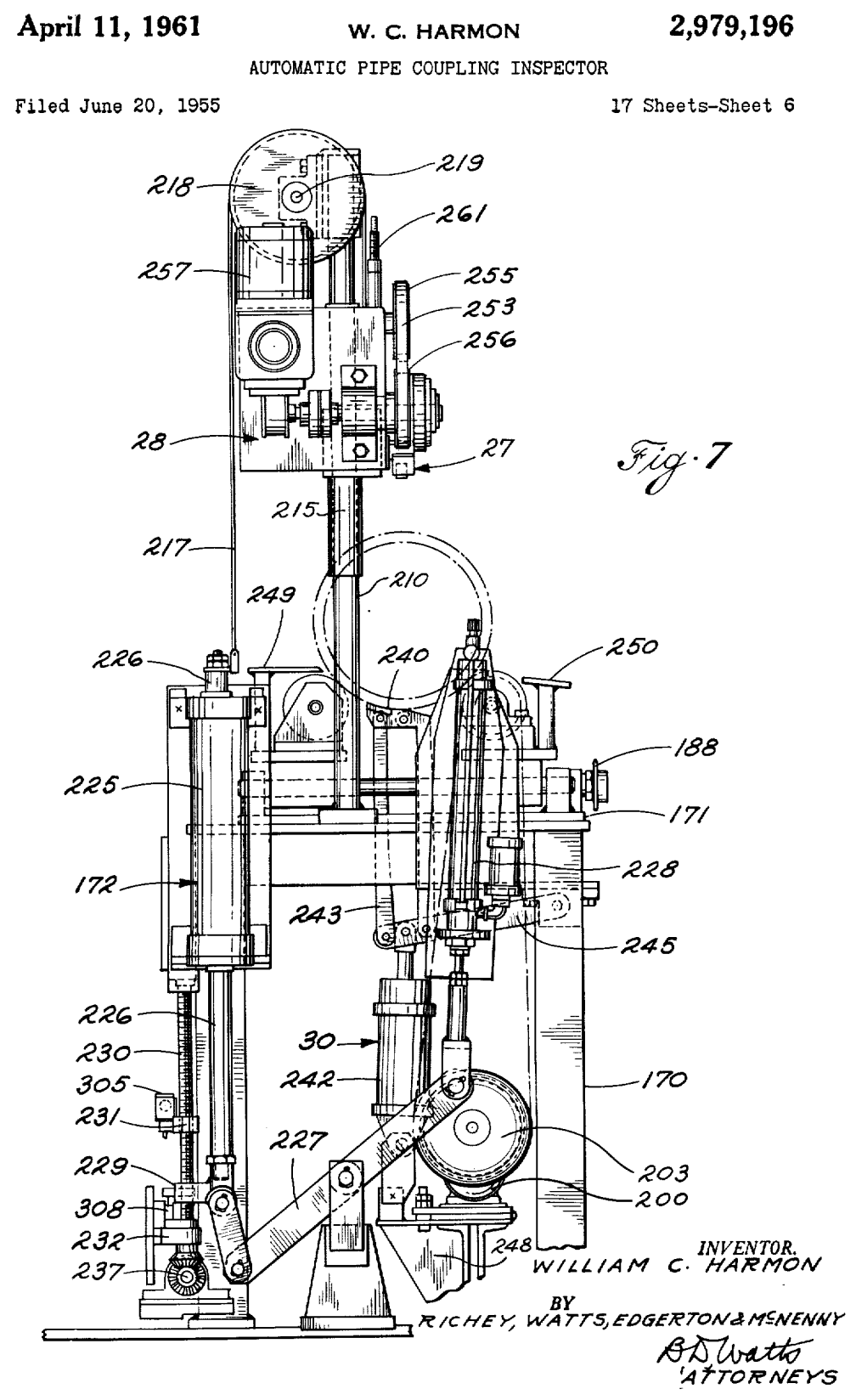

The mechanical construction of the inspecting machine 26 is shown in detail in Figs. 7 to 15, inclusive. The electronic circuits which operate in conjunction with the detector device 27 are shown separately in Fig. 22, and will be described separately. As is shown in Figs. 8 to 12, inclusive, the inspecting machine comprises a frame 170 of hollow rectangular members which support the drive roll head 171, the inspector head 28 and its associated supporting structure, the inspector head actuating apparatus 172, and the discharge apparatus 30.

The drive roll head 171 comprises a base plate 173 which supports two ways 174 and 175 by means of appropriate pieces 176 at the feed end of the machine and pieces 177 at the discharge end of the machine. The rolls 24 and 25 are carried upon members 178 and 179, respectively, which slide upon the ways and carry the shafts 180 and 181 which support the rolls. A lead screw 182 is similarly supported upon two pieces 183 and 184 and is coupled to the roll members 178a and 179a by reverse threads so that the rolls can be moved toward or away from each other by equal distances upon rotation of the lead screw 182. The lead screw 182 is operated by a handle 185 which is coupled to the lead screw through a right-angle coupling 186, two sprockets 187 and 188 and a chain 189.

Two guide rolls 190 and 191 are carried upon ways 192 and 193 disposed transversely to the ways 174 and 175 and supported at the front and the rear of the base plate 173 by two members 194 and 195. The support members 196 and 197 for the guide rolls are carried along the ways by a lead screw 198 which is turned by a handle 199 to move the guide rolls through equal distances toward and away from each other so that a coupling is positioned in the center of the rolls, whatever the length of the coupling.

The drive rolls 25 are secured to the shaft 181 and driven by an electric motor 200 through a speed reducer 201. The speed reducer 201 is coupled to the shaft 181 by means of pulleys 202 and 203 and a V-belt 204. The speed reducer is adjusted by a handle 205.

Figure 11:
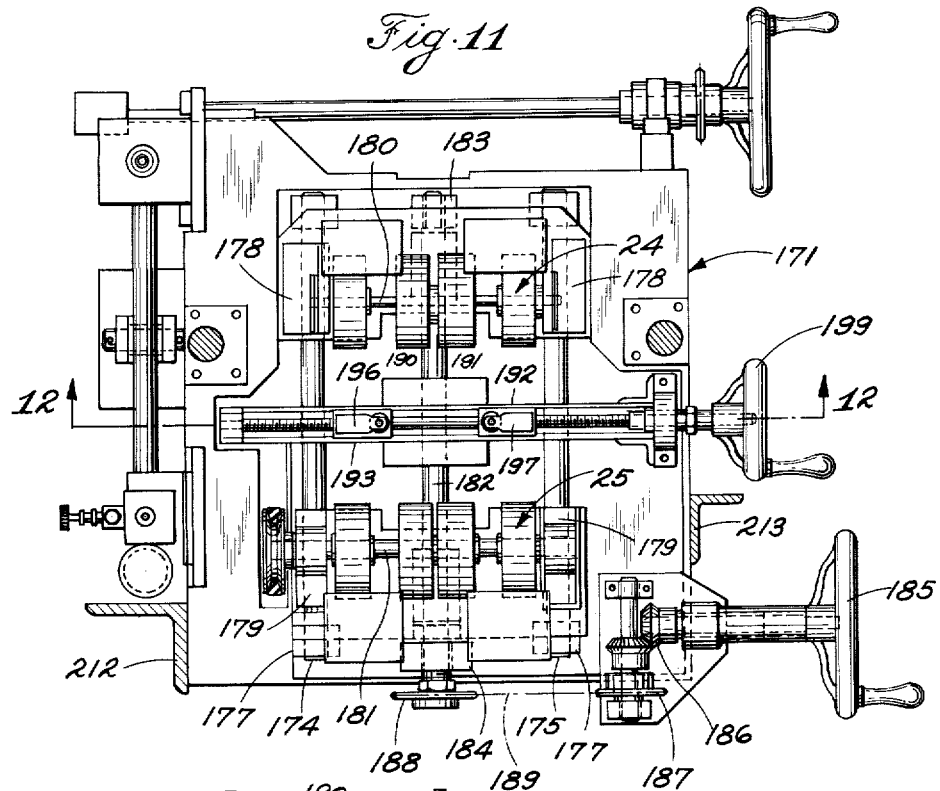
Fig. 11 is a plan view of the bottom portion of the inspecting machine taken in the direction 11—11 in Fig. 8.
Figure 12:
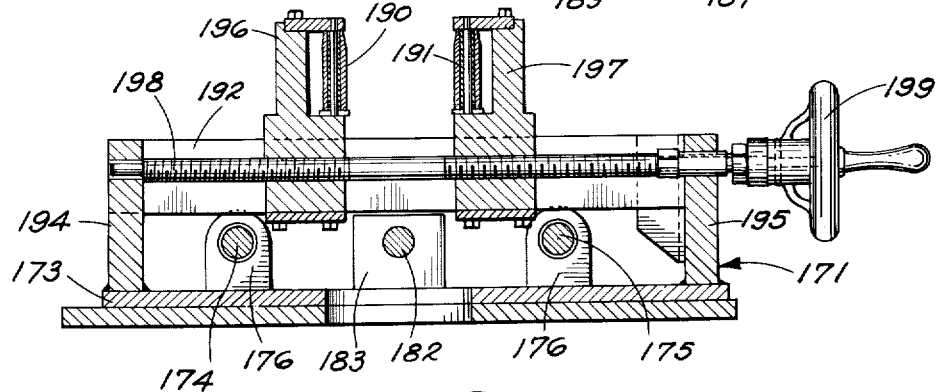
Fig. 12 is a partial view taken in the direction 12—12 in Fig. 11 and illustrating particularly the coupling guide rolls of the inspecting machine.
Figure 13:
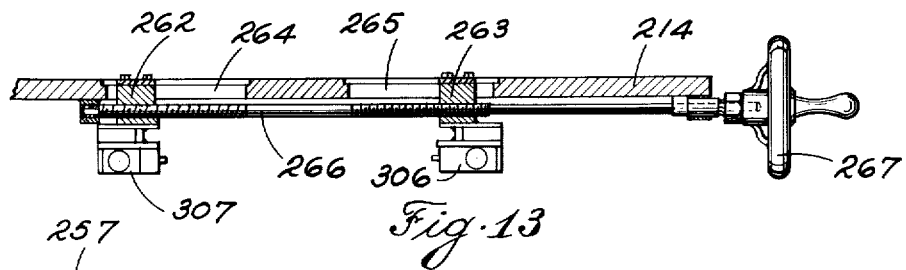
Fig. 13 is an enlarged view of a portion of the inspector head showing particularly the detector head stops and limit switches taken along the line 13—13 in Fig. 8.
Figure 14:
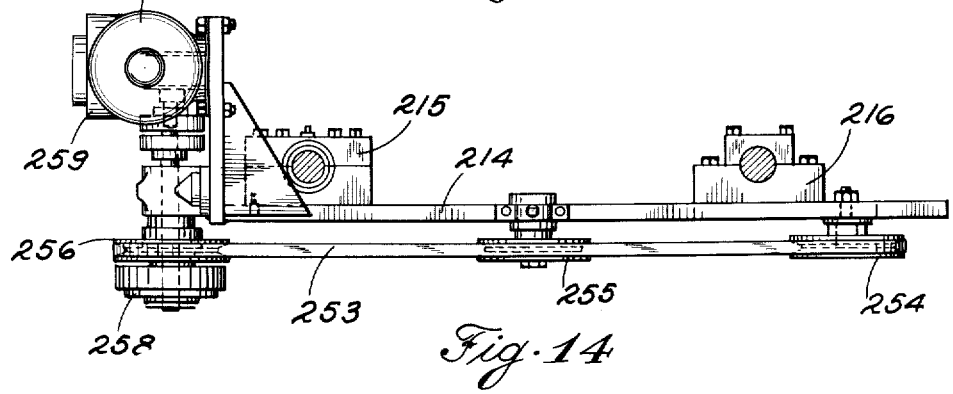
Fig. 14 is a plan view of the inspector head taken along the line 14—14 in Fig. 8.
Figure 15:
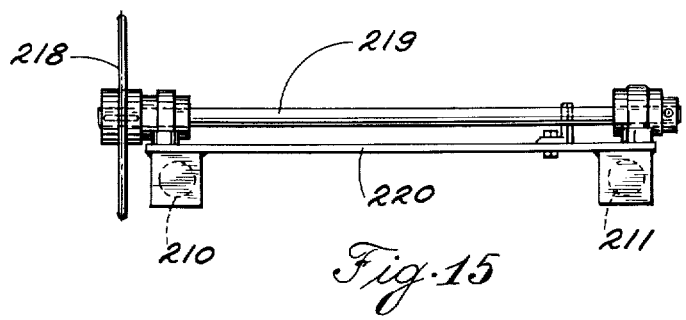
Fig. 15 is a plan view of the cross head of the inspecting machine taken along the line 15—15 in Fig. 8.

The inspector head 28 is carried by two upright ways 210 and 211 which are supported at their lower ends by the frame 170 and braced by two uprights 212 and 213 also supported at their lower ends by the frame 170 (see Figs. 1 and 11). The inspector head 28 comprises a transverse member 214 which is carried upon two blocks 215 and 216. The block 215 incorporates an elongated cylindrical member which slides upon the way 210 to give vertical rigidity to the transverse member 214 while permitting the entire head to slide freely up and down on the ways 210 and 211. The inspector head 28 is supported by means of a cable 217 which extends over a pulley 218 and is connected at its far end to the actuating apparatus 172. The pulley 218 is carried upon a shaft 219 which is supported at the upper ends of the ways 210 and 211 by a cross head 220.

The inspector head actuating apparatus 172 includes an air cylinder 225 which is mounted on the rear side of the frame 170 (see Fig. 9), and serves as an actuator for the inspector head. The piston rod 226 is connected to the cable 217 at the upper end thereof and at the lower end to a linkage 227 and a speed control cylinder 228. The lower end of the piston rod 226 also carries a member 229 which rides upon a threaded shaft 230 and cooperates with two limit stops 231 and 232. The lower stop 232 is fixed on the frame 170 and with an upper member 233 supports the shaft 230. The member 231 is threaded upon the shaft 230 and is constrained against rotation by the frame 170 so that, as the shaft 230 is turned, the position of the upper stop 231 is changed. The shaft 230 is adjusted from the front of the machine by a hand wheel 234 which is coupled to the shaft 230 by means of a chain 235, a shaft 236 and right-angle coupling 237. The limit stops 231 and 232 carry two limit switches 305 and 308 which function to control the operation of air cylinder 225 as will be hereinafter described.

Referring now to Figs. 7, 8 and 10, the discharge apparatus 30 comprises a lifting device 240 which extends through an opening 241 in the bed plate 173 and is operated by an air cylinder 242 which serves as an actuator for the discharge device. The lifter 240 comprises two parallel linkages 243 and 244 which are carried upon a pivoted member 245 and straddle the lead screw 182. The arms of the linkages are maintained in a vertical position by the walls of the opening 241 and by a roller 246. The member 245 is connected to the piston rod 247 of the cylinder 242 which is connected at its lower end to the mounting 248 for the motor 200.

Each linkage of the lifter 240 has a piece which is curved upwardly toward the feed end of the machine so that, when the lifter engages the coupling, the coupling is forced over the roll 25 to the discharge chute 29. Two guides 249 and 250 at the feed side of the roll 24 and at the discharge side of the roll 25, respectively, carry the couplings as they move to and from the rolls.

Referring now to Figs. 7, 8, 13 and 14, the detector head 27 is carried upon a member 252 which is attached to an endless belt 253 and slides along the transverse member 214. The belt 253 is carried by two idler pulleys 254 and 255 and a drive pulley 256, all mounted on the transverse member 214. The drive pulley 256 is connected to a search drive motor 257 through a slip clutch 258 and a speed reducer 259. The idler pulley 255 has a slide mount 260 which may be adjusted by a screw 261.

The inspector head 28 includes two stop members 262 and 263 which slide in two slots 264 and 265 in the member 214 and are positioned by a lead screw 266. The lead screw 266 is coupled to the stop members 262 and 263 by oppositely directed screw threads so that the stop members are moved toward and away from each other by equal distances when the hand wheel 267 is turned. Stop members 262 and 263 also carry two limit switches 306 and 307 which are actuated by the member 252 when the detector head 27 reaches the corresponding extreme position as is described hereinafter. The slip clutch 258 is provided so that the detector head is held in either extreme position until the motor stops.

Figure 16:
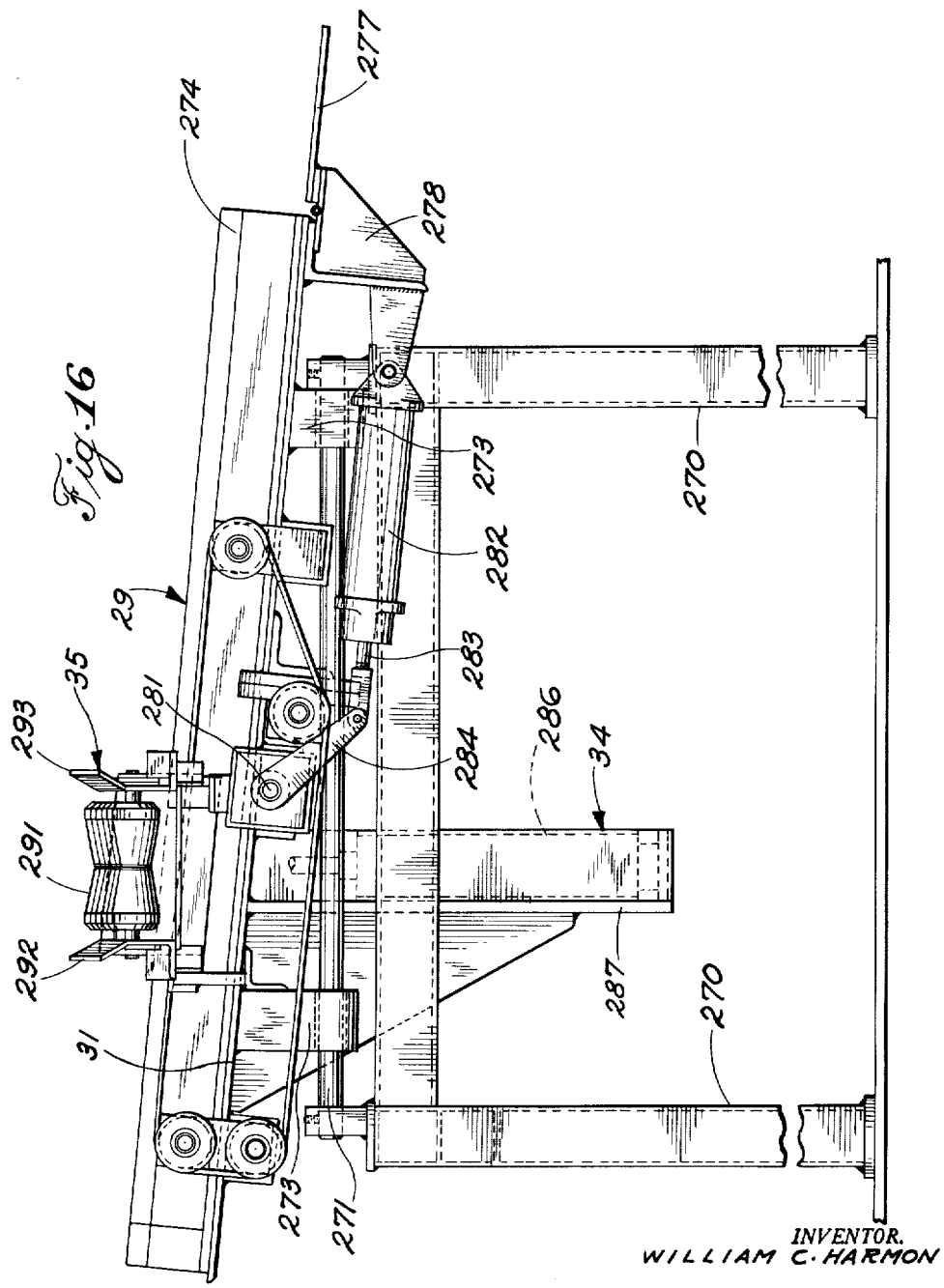
Fig. 16 is an elevation view of the discharge apparatus of the sorting machine taken from the back of the machine.
Figure 17:
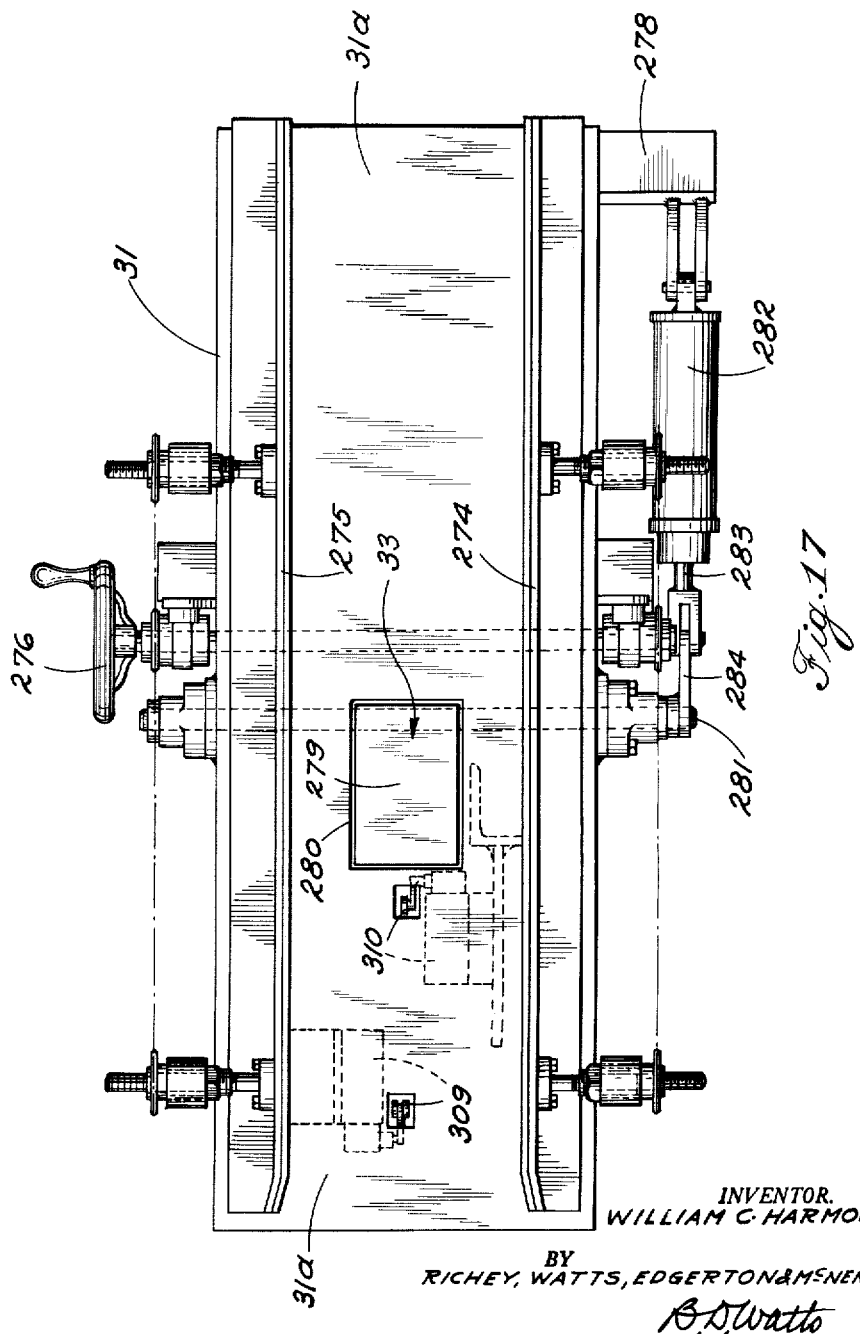
Fig. 17 is a plan view of the discharge apparatus of Fig. 16.
Figure 18:
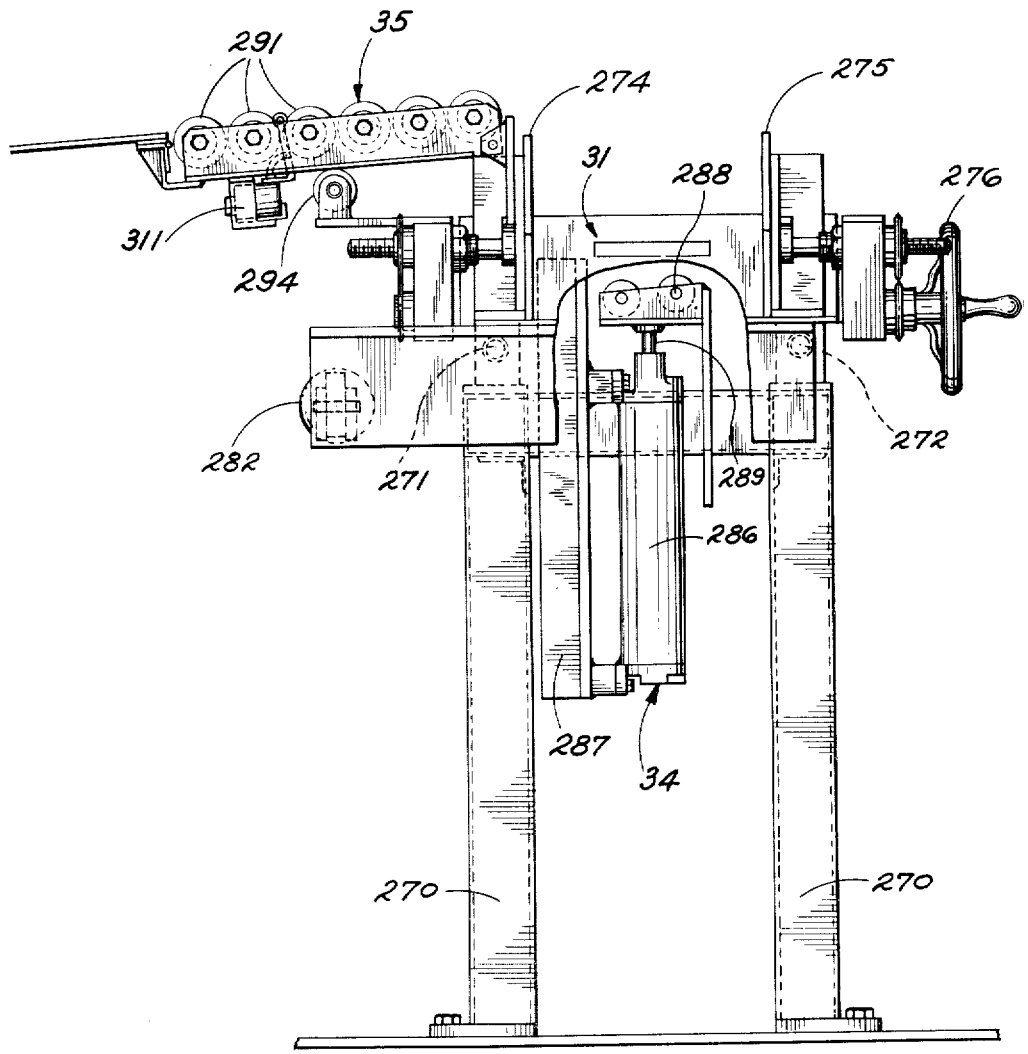
Fig. 18 is an elevation view of the discharge apparatus of Fig. 16 taken from the discharge end of the apparatus.

Referring now to Figs. 16, 17 and 18, the discharge apparatus 29 is supported by the frame 270 and is carried by two ways 271 and 272. The discharge chute 29 has a bed plate 31a which is supported from the ways by the members 273 and inclined at an angle such that the coupling will roll freely down the chute. The remaining discharge apparatus is supported from the chute so that the entire assembly can be moved along the ways 271 and 272 to accommodate the position of the feed end of the chute to the position of the member 250 on the inspecting machine.

The chute 29 has two side boards 274 and 275 which may be adjusted transversely by hand wheel 276 in the same manner as the side boards of the chutes 22 and 13. An adjustable discharge gate 277 is mounted upon an end plate 278 to carry the acceptable couplings into the tote box 32 of Fig. 1.

The gate 33 comprises a flat member 279 fitted into an opening 280 in the bed 31a of the chute 29 and is carried by a shaft 281 so that the plate 279 is normally flush with the upper surface of the bed 31a. The gate 33 is operated by an air cylinder 282 which is supported from the end plate 278 and has the piston rod 283 connected to a bell crank 284 mounted on the end of the shaft 281. The pneumatic cylinder 282 serves as an actuator for the gate 33 and is controlled in part by a switch 309, as will be hereinafter described.

The coupling elevator 34 comprises an air cylinder 286 which is mounted on a vertical member 287, suspended from the bed plate 31a, and a coupling carrier 288 mounted at the top end of the piston rod 289. The pneumatic cylinder 286 serves as an actuator for the elevator 34 and is controlled by a switch 310 hereinafter described.

When the switch 310 is actuated by a defective coupling, the cylinder 286 is operated to lift the carrier 288 through the opening 280 and lift the coupling to the discharge conveyor 35. The discharge conveyor 35 includes a plurality of biconical rolls 291 which are carried by two side plates 292 and 293, supported by the side board 274. The members 292 and 293 ride upon a fixed roll 294 to accommodate the inward and outward movement of the side boards 274 and 275 when the spacing of the side boards is adjusted for different size couplings. A switch 311 is mounted on the conveyor 35 and is actuated by the imperfect couplings as they roll down the conveyor.

Each of the pneumatic cylinders 48, 94, 164, 225, 242, 286 and 282 and the braking cylinder 228 of the inspection machine are of the type whose speed of operation may be controlled by speed control valves. The speed control valve adjustments are important in that the timing of subsequent operations is referred to the initiation of any given operation, and each cylinder must act within a prescribed time. Thus, the actuation of the switch 311 controls the return of both the gate 33 and the elevator 34 and the cylinder 286 must retract the carrier 288 before the cylinder 282 lowers the gate 33.

The operation of the pneumatic cylinders and motors is controlled by electrical switches 360 to 311, inclusive, referred to above, which are actuated by the couplings as they move through the machine or by the apparatus associated with the actuators as the operations upon the pipe couplings are initiated or terminated. The switches are connected in certain electrical control circuits (shown in Figs. 20 and 21) which include solenoid operated valves for controlling the air supply to the pneumatic cylinders, and various relays and contactors for energizing and deenergizing the motors in the proper sequence and for the necessary intervals.

Figure 19:
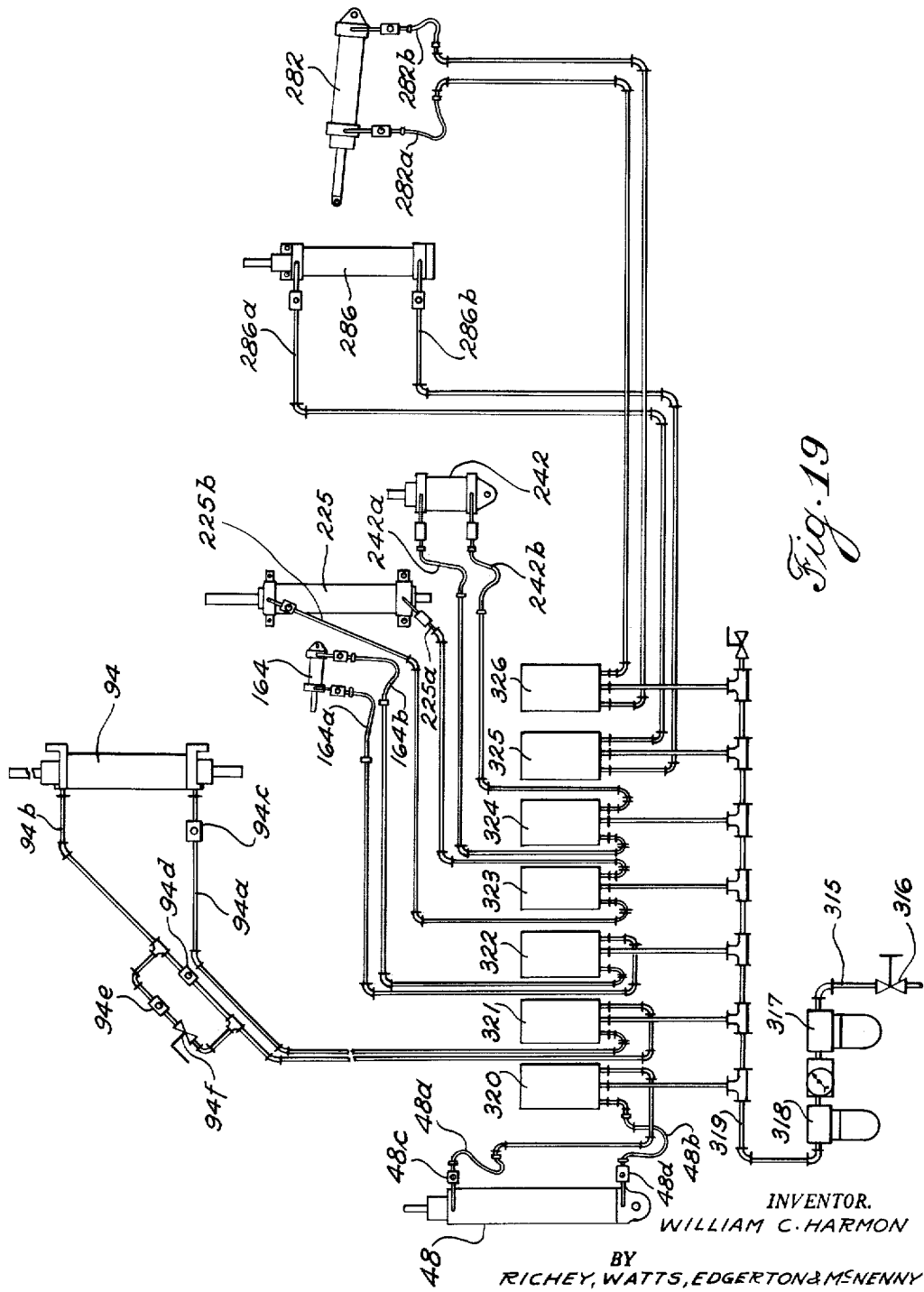
Fig. 19 is a schematic diagram of the pneumatic system of the invention.

Referring now to Fig. 19, there is shown the arrangement of the various pneumatic cylinders which serve as actuators for the apparatus as hereinabove described. The pneumatic system includes a main line 315 which is connected to an air compressor (not shown) through a valve 316. The compressed air is transmitted through a pressure regulator 317, an oiler 318 and a feed line 319 to a plurality of solenoid operated valves 320, 321, 322, 323, 324, 325 and 326. The valves 320 to 326, inclusive, control the supply of compressed air to the pneumatic cylinders 48, 94, 164, 225, 242, 286 and 282, respectively, the two outlets of the valve being connected to the ends of the cylinder as is indicated by the number of the cylinder followed by the letters "a" and "b," respectively. Each of the valves 320 to 326, inclusive, is a two-position valve such that, when the solenoid is deenergized, compressed air normally flows to one end of the cylinder, and, when the solenoid is energized and the valve actuated, compressed air flows to the remaining end of the cylinder. Thus, with the solenoid of valve 320 deenergized, compressed air is supplied to the upper end of the coupling elevator cylinder 48 through the line 48a. When, however, the solenoid of valve 320 is energized, the valve is actuated to close the valve passage to the feed line 48a and open the valve passage to the feed line 48b. Compressed air is supplied to the bottom of the cylinder 48 to extend the piston and lift the coupling elevator and hold the elevator in the extended position until such time as the solenoid of valve 320 is deenergized, whereupon compressed air is supplied to the upper end of the cylinder to retract the piston rod and the coupling elevator.

The operation of valves 321 to 326, inclusive, and the associated cylinders is similar to that of the valve 320 and cylinder 48 and will be understood without further description.

Each of the cylinder feed lines is provided with a speed control valve so that the speed of the piston in each direction may be adjusted independently of the speed in the opposite direction. Thus, the feed lines 48a and 48b of the cylinder 48 have speed control valves 48c and 48d, respectively. The speed control valve 94d of cylinder 94 is provided with a by-pass control valve 94c and a manually operated valve 94f for increasing the down travel speed of the cleaner head when the machine is used to inspect small diameter couplings.

Figure 20:
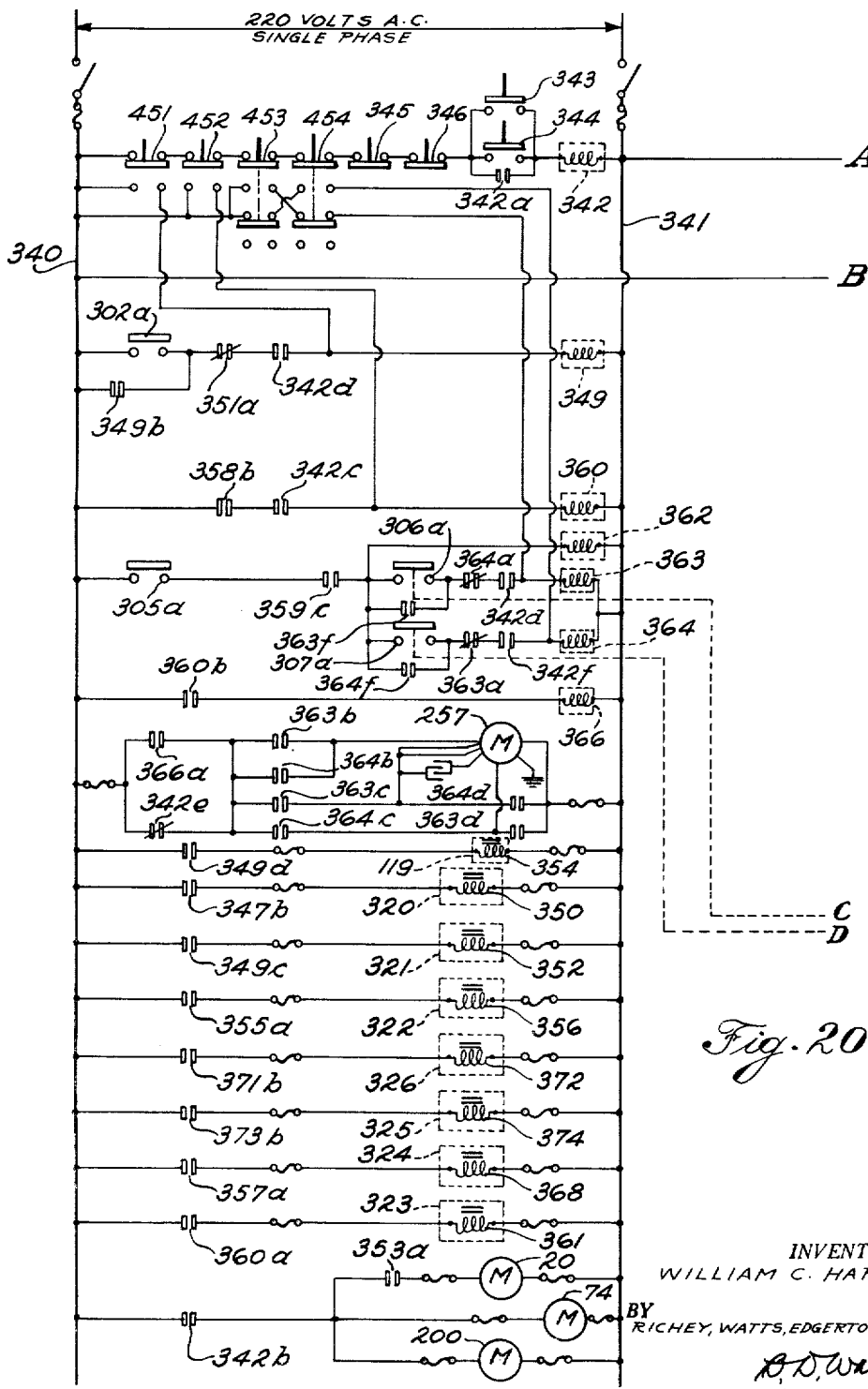
Figs. 20 and 21 are schematic diagrams of the electrical control circuits of the invention.
Figure 21:
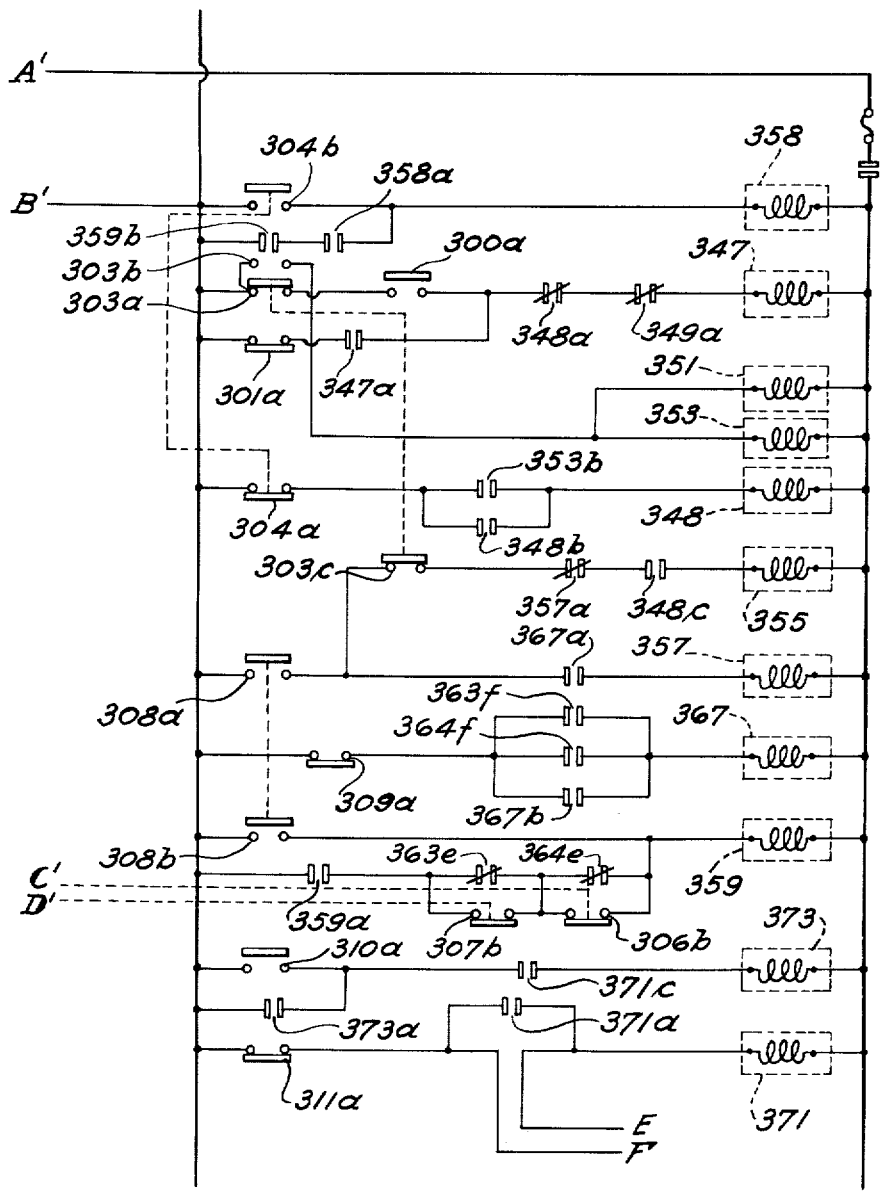

Referring now to Figs. 20 and 21, the electrical control circuits are energized with ordinary sixty-cycle alternating current from two power leads 340 and 341. The circuits are under the overall control of a master relay 342 which is operated by a master control including two manual start switches 343 and 344 and manual stop switches 345 and 346. A normally open contact 342a of relay 342 connected across the manual start switches 343 and 344 serves as a hold-in circuit to maintain the master relay in an energized condition after the start switches are released. Operation of the master relay 342 closes normally open contacts 342b to energize the cleaner roll drive motor 74 and inspector roll drive motor 200. The roll drive motors 74 and 200 run continuously whenever the machine is operated.

Actuation of the elevator start switch 300 closes the normally open contacts 300a to energize the coupling elevator relay 347 through the contacts 303a of the cleaner head up switch 303, the normally closed contacts 348a of a coupling kick-out auxiliary relay 348 and the normally closed contacts 349a of a cleaner head down relay 349. The coupling elevator relay 347 is actuated to close normally open contacts 347a and complete a holding circuit through normally closed contacts 301a of the coupling elevator return switch 301 across contacts 300a and 303a of the elevator start switch 300 and cleaner head up switch 303. Normally open contacts 347b of the coupling elevator relay 347 are closed to energize the solenoid 350 of the coupling elevator valve 320 and cause the coupling to be lifted to the chute 13.

Actuation of the coupling elevator return switch 301 by the coupling as it rolls down the chute 13 opens the contacts 301a and the holding circuit for the coupling elevator relay 347 to deenergize that relay and open contacts 347a and 347b. Deenergization of the solenoid 350 and deactuation of the valve 320 returns the elevator to the down position to receive another coupling.

The cleaner head down switch 302 is actuated by the coupling to close the normally open contacts 302a and energize the cleaner head down relay 349 through the normally closed contacts 351a of a cleaner head up relay 351 and the contacts 342d of the main relay 342. Actuation of the cleaner head down relay 349 closes normally open contacts 349b to establish a holding circuit across the contacts 302a and maintain relay 349 in an energized condition. Contacts 349c are closed to energize the solenoid 352 of the cleaner head valve 321 and pass compressed air to the upper end of the cylinder 94. The cleaner head 18 is then lowered to a cleaning position with the brush 19 in contact with the outer surface of the coupling.

As the cleaner head 18 left its uppermost position, the cleaner head up switch 303 was deactuated to open contacts 303a and close contacts 303b, thereby energizing the cleaner head up relay 351 and the cleaner drive relay 353. Actuation of the cleaner drive relay 353 closes contacts 353a to energize the cleaner motor 20 preparatory to cleaning the coupling. Contacts 349d were closed when the cleaner head down relay was actuated and energized the solenoid 354 of the water valve 119 so that the cleaner head is operating when it reaches its lowermost position and the brush engages the coupling.

When the cleaner drive relay 353 was actuated, normally open contacts 353b were closed to energize the auxiliary coupling kick-out relay 348 which is operated to close normally open contacts 348b which form a holding circuit across the contacts 353b and maintain the auxiliary coupling kick-out relay 348 in an energized condition through the normally closed contacts 304a of an inspector head down start switch 304. Simultaneously therewith, the normally closed contacts 348a of the relay 348 open to deenergize the coupling elevator relay 347 and disable the elevator circuit so that a second coupling cannot be lifted onto the chute 13. Similarly, normally open contacts 348c close to establish a circuit for the coupling kick-out relay 355 so that the relay 355 may be energized when the contacts 303c of switch 303 are closed upon retraction of the cleaner head.

The cleaner head up relay 351 which was energized when contacts 303b were closed is an adjustable time delay relay which deactuates itself upon the elapse of a predetermined interval after the relay is energized. Thus, upon the elapse of some interval necessary to complete the cleaning of the coupling (say two seconds) the contacts 351a are opened to deenergize the cleaner head down relay 349 and open contacts 349b and the holding circuit for the relay 349. Contacts 349c are opened to deenergize the solenoid 352 of the cleaner head valve 321 and thereby retract the cleaner head to its up position and contacts 349d are opened to close the water valve 119. Contacts 349a are closed to partially reestablish the circuit of the coupling elevator relay 347.

When the cleaner head reaches its uppermost position, the cleaner head up switch 303 is actuated to open contacts 303b and deenergize relays 351 and 353, and thereby reestablish the cleaner head down relay 349 when the contacts 351a return to their normally closed position.

Contacts 303a are closed to again establish the coupling elevator relay 347 circuit preparatory to receiving the next coupling. Contacts 303c are closed to complete the circuit to the coupling kick-out relay 355 and energize that relay. Upon actuation of the relay 355, normally open contacts 355a are closed to energize the solenoid 356 of the coupling kick-out valve 322. The coupling kick-out valve 322 then passes compressed air to the cylinder 164 to lift the coupling from the cleaner rolls to the chute 22.

The circuit through contacts 308a of switch 308, contacts 303c of switch 303 and the normally closed contacts 357a of the coupling discharge relay 357 prevents the coupling kickout from being operated unless the cleaner head is fully retracted, the inspector head in its uppermost position with switch 308 actuated, and the inspector machine rolls are empty.

When the inspector head down start switch 304 is actuated by the coupling as it rolls down the chute to the inspector rolls, the closed contacts 304a are momentarily opened, deenergizing the auxiliary coupling kick-out relay 348. Contacts 348b are opened to break the holding circuit and leave relay 348 in an unactuated condition after contacts 304a reclose and contacts 348c are opened to deenergize the coupling kick-out relay 355. Contacts 348a close to complete the circuit to the coupling elevator relay 347 if a coupling is in place on the elevator and contacts 300a of the elevator start switch 300 are closed or if couplings are not in place, the circuit is established so that operation of switch 300 completes the circuit.

When the coupling kick-out relay 355 is deactuated, contacts 355a open to deenergize solenoid 356 and deactuate valve 322 to retract the coupling kick-out to an inoperative position.

With the inspector head in the full up position, switch 308 is actuated, closing contacts 308B and energizing relay 359 which closes holding contacts 359A and contacts 359B. The actuation of the inspector head down start switch 304 closes contact 304b to energize the inspector head down relay 358. Actuation of relay 358 closes normally open contacts 358a to form a holding circuit through the closed contacts 359B of the inspector head up relay 359. Contacts 358b close, energizing the auxiliary inspector head down relay 360 through the closed contacts 342c of the main relay 342. The auxiliary inspector head down relay is actuated to close the normally open contacts 360a to energize solenoid 361 of the inspector head valve 323. The valve 323 then passes compressed air to the lower end of the cylinder 225 to lower the inspector head and deactuate the inspector head up limit switch 308.

When the inspector head up limit switch 308 is deactuated, normally open contacts 308a are opened to disable the circuits of the coupling kick-out relay 355 and the coupling discharge relay 357. With the contacts 308a open, the relays 355 and 357 and the cylinders 164 and 242 cannot be operated. The contact 308a thus locks the apparatus to insure that couplings cannot be transferred to or from the inspector rolls while the inspector head is in a lowered position.

When switch 308 is deactuated, contacts 308b also open. However, the inspector head up relay 359 which had been energized when the start switch 343 or 344 was operated is locked in by the contacts 359a which form a holding circuit with relay contacts 363E and 364E and switch contacts 307B and 306B. Consequently, when the contacts 308b are opened, contacts 359a remain closed and, when the inspector head reaches the down position and actuates the inspector head down limit switch 305, contacts 305a are closed to energize the time delay relay 362 and either the forward relay 363 or reverse relay 364 for the inspector head drive motor.

If, when the contacts 305a close, the detector head 27 is stopped at the front of the head 28, the front traverse limit switch 306 is actuated, contacts 306a are closed and contacts 306b are open. Similarly, the back traverse limit switch 307 is deactuated and contacts 307a are open and contacts 307b are closed. When contacts 305a close, the forward relay 363 is energized through the normally closed contacts 364a of the reverse relay 364, the closed contacts 342d of the main relay 342, and closed contacts 359C of relay 359. However, since normally closed contacts 342e of the main relay 342 are open, the detector head drive motor 257 cannot start until after the contacts 360B of the time delay relay 360 have been closed to energize the auxiliary time delay relay 366 and close contacts 366a. Contacts 363b, 363c and 363d were closed when relay 363 was actuated so that the detector head drive motor 257 turns in the proper direction when relay 366 is actuated and the contacts 366a are closed. The delay imposed by the time required for the contacts of relay 366 to close, allows the drive rolls to turn the coupling through approximately one turn so that the end of the coupling is inspected before the detector head starts to traverse the length of the coupling.

The forward relay 363 has holding contacts 363f across contacts 306a of the front traverse limit switch 306 while the reverse relay 364 has holding contacts 364f across the contacts 307a of the back traverse limit switch 307.

Conversely, if, when contacts 305a close, the detector head is stopped at the rear of the inspector head, the rear switch 307 is actuated, contacts 307a are closed and contacts 307b are open. The front switch 306 is deactuated and contacts 306a are open and contacts 306b are closed. When contacts 305a close, the reverse relay 364 is energized through the normally closed contacts 363a of the forward relay 363, the closed contacts 342f of the main relay 342, and closed contacts 359C of relay 359. Contacts 364b, 364c and 364d are closed so that, when contacts 366a of relay 366 close, the detector head drive motor 257 is driven in the proper direction.

When the search coil reaches the end of its traverse, the corresponding one of the limit switches 306 or 307 is actuated to deenergize the inspector head up relay 359 by opening contacts 306b or 307b and the associated one of relays 363 or 364 by opening contacts 359C to stop the drive motor. Thus, in the first instance, when the detector head started at the front of the inspector head, the switch 307 would be operated to close contacts 307a and open contacts 307b. Relay 364 would thus be energized to open the normally closed contacts 364a and deenergize relay 363 to open contacts 363b, 363c and 363d and deenergize the motor 257. When contacts 307b open, the energizing circuit for relay 359 is opened and the relay 359 is deactuated to open holding contacts 359a before the normally closed contacts 363e close. The converse operation takes place in the second instance where the detector head is stopped at the rear of the inspector head and moves to the front. It will be seen that, when the traverse of the detector head to scan a given coupling is completed, the circuit is automatically readied to start a succeeding traverse in the opposite direction to scan the next succeeding coupling.

When the inspector head up relay 359 is deenergized by the opening of contacts 306b or 307b, the contacts 359b in the holding circuit for the inspector head down relay 358 are opened, thus deenergizing the relay 358. The relay 358 is a time delay relay such that the contacts 358b do not open until the expiration of a predetermined interval, e.g. about one second, after the relay is deenergized. When the contacts 358b open, the auxiliary relay 360 is deenergized to open contacts 360a and deenergize the solenoid 361 of the inspector head valve 323. When the solenoid 361 is deenergized, the valve 323 is deactuated to lift the inspector head 28 to the retracted position.

The time interval provided by the inspector head down relay 358 allows the coupling to turn through at least one revolution so that the end of the coupling is scanned by the detector head. It will be seen that the relative movement of the detector head 27 and the coupling is such that the path followed by the detector head along the outer surface of the coupling is first circular about one end of the coupling, then helical from one end of the coupling to the remaining end and again circular at the remaining end of the coupling.

When the inspector head 28 is retracted, the inspector head down limit switch 305 is open to disable the circuit to the traverse motor relays 363 and 364. When the inspector head 28 reaches the full up position, the inspector head up limit switch 308 is actuated and contacts 308a and 308b closed. When contacts 308a close, the coupling discharge relay 357 is energized through the contacts 367a of the auxiliary coupling discharge relay 367. The contacts 367a were closed when the relay 367 was energized through the contacts 363f or 364f of relay 363 or relay 364 and contacts 367b closed to maintain the relay 367 in an energized condition after the relays 363 and 364 were deenergized. When relay 357 is energized, contacts 357a close, energizing the solenoid 368 of the coupling discharge valve 324. The valve 324 is actuated to operate the coupling discharge apparatus 30 and lift the coupling from the inspector drive rolls 24 and 25 to the discharge chute 29.

As the coupling rolls down the discharge chute 29, it passes over and momentarily actuates switch 309 to open contacts 309a. When contacts 309a are opened, the auxiliary relay 367 is deenergized to open contacts 367a, deenergize relay 357, open contacts 357a and deenergize the solenoid 368. When the solenoid 368 is deenergized, the valve 324 is deactuated and the coupling discharge apparatus 30 is returned to the down position. This latter operation readies the inspecting machine to receive a succeeding coupling.

If while the coupling was being scanned by the detector head, the electronic circuits associated therewith sensed an imperfection or flaw in the coupling, those circuits energized a relay 370 (see Fig. 22) to close contacts 370a. When contacts 370a closed, the coupling reject stop relay 371 is energized through the contacts 311a of switch 311. Relay 371 is actuated and closes contacts 371a to establish a holding circuit across the contacts 370a and contacts 371b close to energize the solenoid 372 of the reject stop valve 326. The reject stop valve 326 is actuated to operate the pneumatic cylinder 282 and lift the gate 33 into position to stop the coupling.

When relay 371 was actuated, contacts 371c were also closed to ready the circuit of the reject lift relay 373. Consequently, when the coupling passes over and momentarily actuates the switch 310, the relay 373 is actuated to close the contacts 373a and establish a holding circuit for the relay 373. Contacts 373b are closed to energize the solenoid 374 of the reject lift valve 325 which is actuated to operate the pneumatic cylinder 286 and lift the imperfect coupling to the discharge conveyor 35.

When the imperfect coupling rolls down the conveyor 35, the switch 311 is actuated to open the contacts 311a and deenergize relays 371 and 373 and return the cylinders 282 and 286 to their normal positions.

If the electronic circuits associated with the detector head 27 did not detect a flaw or imperfection in the coupling as the coupling was being scanned, the actuation of the reject lift switch 310 will have no effect upon the reject lift circuits since the contacts 371c are open.

Figure 22:
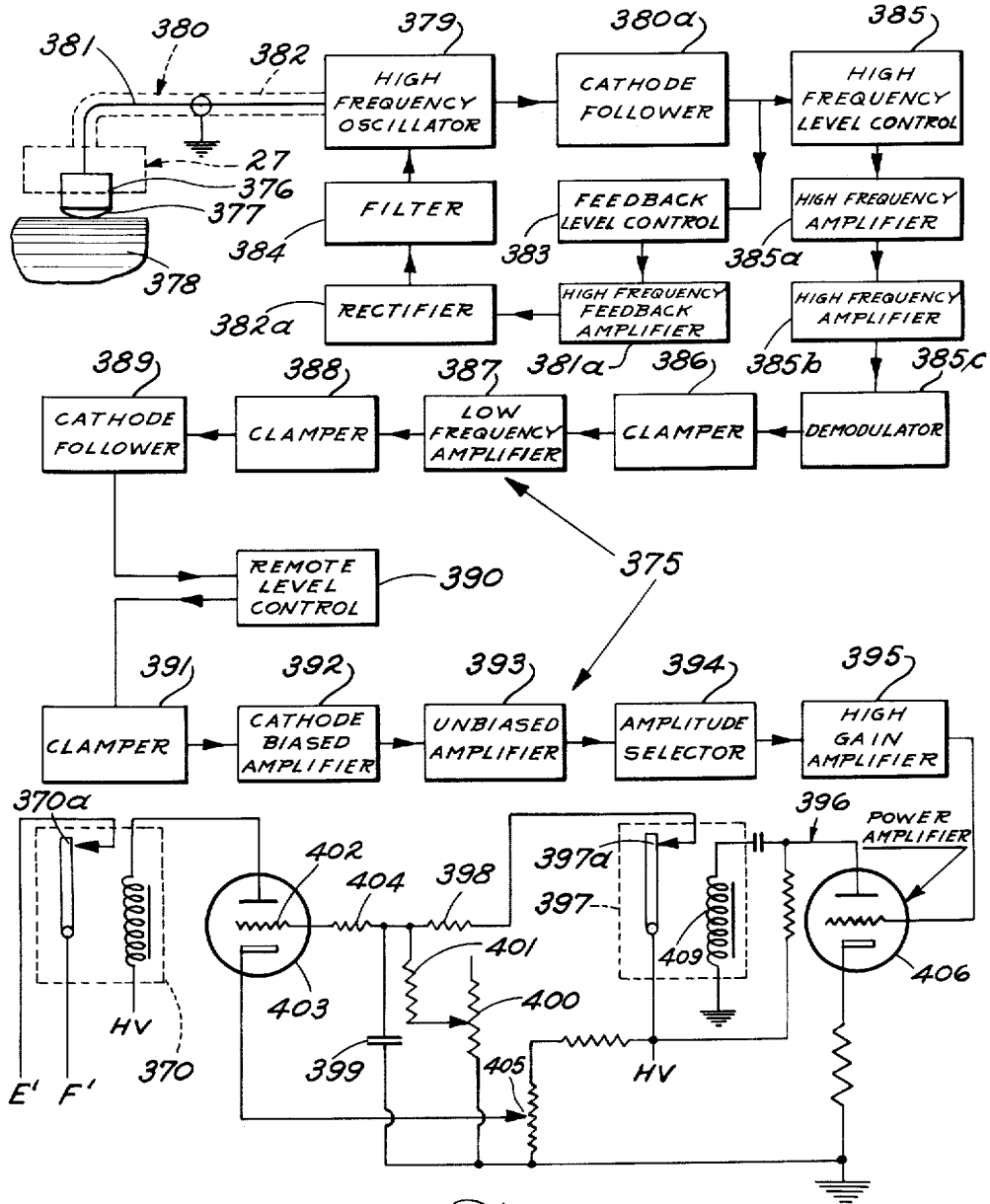
Fig. 22 is a block and schematic diagram of the electronic detector circuits associated with the detector of the inspecting machine.

Referring now to Fig. 22, the electronic circuits 375 of the inspecting machine 26 are shown in block form together with a schematic diagram of a portion of the circuit interconnecting the electronic circuit with the electrical control circuits of Figs. 20 and 21. The electronic circuits are substantially those of my Patent No. 2,660,704, issued November 24, 1953, and my applications, Serial No. 306,445, filed August 26, 1952, now abandoned, and Serial No. 473,718, filed December 7, 1954, now Patent No. 2,832,040.

The detector head 27 includes a search coil 376 and a sapphire shoe 377 and is represented schematically in Fig. 22. The detector head is shown in its operative position with the shoe 377 contacting the outer surface of a pipe coupling 378, as though the inspector head 28 were down and the pipe coupling being inspected.

The detector head 27 is connected to a high frequency oscillator 379 by means of a concentric cable 380 which has the inner conductor 381 connected to the search coil 376 and the shield conductor 382 grounded. The high frequency oscillator 379 generates oscillations in the order of 10,000 cycles and has the search coil as a frequency determining element. The anode circuit of the oscillator is coupled to a cathode follower 380a which functions as an isolating circuit and has the output circuit thereof connected to the input of the high frequency feedback amplifier 381a through a feedback level control 383. The feedback level control 383 comprises a means such as a potentiometer for adjusting the amplitude of the signal voltages which are transmitted to the amplifier 381a. The amplified output of the feedback amplifier 381a is coupled to a feedback rectifier 382a and a filter 384 is connected from the feedback rectifier 382a preferably to the grid circuit of the oscillator 379 to vary the grid bias of an oscillator tube. The feedback voltages serve to vary the amplitude level of oscillation in accordance with the amplitude of the signals returned to the oscillator. The filter 384 serves as a time delay or integrating device so that changes in amplitude of the signals at the output of the oscillator which are returned to the oscillator through the filter 384 do not immediately produce changes in grid bias which would oppose the original changes. Consequently, as the pipe coupling 378 moves relative to the detector head 27, flaws or imperfections in the pipe coupling will produce changes in the amplitude of the high frequency signals which appear at the output of the cathode follower 380a.

The signals from the cathode follower 380a are also transmitted through a high frequency signal level control 385, and two high frequency amplifiers 385a and 385b to a demodulator 385c which rectifies the high frequency signals and transmits the changes in the signals which are produced by the flaws or imperfections as relatively low frequency signals. These changes are denoted as low frequency signals by way of distinction from the signals which are generated by the oscillator 379. The mode of operation of these circuits is described in more detail in the patent and the applications referred to above.

The low frequency signals ta the output of the demodulator 385c are transmitted to a clamper 386, a two-stage low frequency amplifier 387 and a second clamper 388. A cathode follower 389 connected to the output of the clamper 388 provides a low impedance output for transmitting the amplified signals to a remote level control 390. The low impedance circuit minimizes extraneous pick-up due to the high frequency fields usually prevalent in the locations in which the apparatus is used.

The remote level control may consist of a potentiometer or the like and is utilized to provide remote adjustment of the signal amplitude. The output of the remote level control 390 is connected to a clamper 391 which has its output connected to the input of a cathode biased amplifier 392. The cathode biased amplifier 392 and an unbiased amplifier 393 further amplify the signal changes which then passed to an amplitude selector 394 comprising a biased diode rectifier. The signal from the amplitude selector 394 is then further amplified by a high gain amplifier 395 to drive the power amplifier 396. The particular combination of the cathode biased amplifier 392, the unbiased amplifier 393 and the amplitude selector 394 is important inasmuch as the operation of the amplifiers and the amplitude selector is such that a high degree of differentiation is provided between the signal impulses which are due to the presence of flaws in the pipe coupling and those which are essentially random in nature. The amplitude selector will only pass signal impulses whose magnitude exceeds that of the bias and, with the high gain amplifier 395, produces an impulse whose rise time approximates that of a square wave. Such an impulse wave form facilitates the positive operation of the relay 397 which is connected in the anode circuit of the power amplifier 396.

The contacts 397a of the relay 397 are connected to the high voltage supply and through a series resistor 398 to a capacitor 399, a potentiometer 400, and a resistor 401 connected in series with the variable contact of the potentiometer. The resistors 398 and 401 and capacitor 399 are connected to the grid electrode 402 of a triode 403 through a series resistor 404. The triode 403 has the reject control relay 370, previously referred to, connected in its anode circuit and has a normal anode current such that the contacts 370a are open. A cathode potentiometer 405 provides a cathode bias for the triode 403.

When an impulse produced by a flaw in the coupling 378 is impressed upon the grid electrode of the power amplifier triode 406, the relay 397 is operated momentarily to close the contacts 397a. Contacts 397a close to connect the capacitor 399 to the high voltage supply and charge the capacitor while driving the grid electrode 402 of the triode 403 sufficiently positive to actuate the relay 370 and close the contacts 370a. Because of the transitory nature of the impulses produced by the flaws, relay 397 is soon deactuated and contacts 397a open. However, the relay 370 is maintained in a closed condition by the voltage across the capacitor 399 which discharges at a rate determined by the setting of potentiometer 400. When the capacitor 399 discharges sufficiently to reduce the voltage on the grid electrode 402, the relay 370 is deactuated.

It will be seen that the electronic circuits can be readily adjusted so that only couplings containing flaws of greater than a predetermined extent will operate the reject control relay 370 and cause the coupling to be rejected by the discharge apparatus 29.

As is shown in Fig. 20, a number of manually operated push buttons 451, 452, 453 and 454 are provided for separately energizing various control relays in order that the several mechanisms may be adjusted for various conditions of operation.

It is to be understood that the specific nature of the present disclosure is not intended to be restrictive or confining, but that various rearrangements of the apparatus may be resorted to, giving effect to a reasonable breadth of construction of the express language of the claims, as hereinafter set forth.

What is claimed is:

1. A machine for successively cleaning, inspecting and sorting pipe couplings and the like comprising, in combination, a cleaning machine for cleaning the outer surface of the coupling, means for delivering couplings one at a time to the cleaning machine, an inspecting machine having an electronic flaw detecting apparatus for detecting imperfections in the cleaned coupling and including a detector head electrically connected to the detecting apparatus and adapted to scan the outer surface of the coupling means for automatically transferring couplings from the cleaning machine to the inspecting machine, and discharge means for separating a defective coupling from the remaining couplings when the detecting apparatus locates an imperfection while scanning the coupling, means for causing the said means for delivering couplings to deliver a coupling to the cleaning machine, for causing the cleaning machine to clean the coupling, for causing the means for transferring couplings to transfer the coupling from the cleaning machine after cleaning to the inspecting machine, for causing the detector head and the detection apparatus to inspect the coupling, and for causing the means for removing the coupling to remove the coupling from the inspecting machine after the detection step, said discharge means functioning after the means for removing has removed the inspected coupling from the inspecting machine.

2. A machine for successively cleaning, inspecting and sorting pipe couplings and the like comprising, in combination, a cleaning machine for cleaning the outer surface of the coupling and including means capable of being energized, electrically actuated means for delivering couplings one at a time to the cleaning machine, an inspecting machine having an electronic flaw detecting apparatus for detecting imperfections in the cleaned coupling and including a detector head electrically connected to the detecting apparatus and adapted to scan the outer surface of the coupling, electrically actuated means for automatically transferring couplings from the cleaning machine to the inspecting machine, and discharge means electrically actuated by said detecting apparatus for separating a defective coupling from the remaining couplings when the detecting apparatus locates an imperfection while scanning the coupling, and electrical control means connected to the several aforesaid electrically actuated means for successively energizing the said electrically actuated means for operating the cleaning machine, inspecting machine, and transfer means to automatically sort couplings which are delivered to the sorting machine, means for causing the said means for delivering couplings to deliver a coupling to the cleaning machine, for causing the cleaning machine to clean the coupling, for causing the means for transferring couplings to transfer the coupling from the cleaning machine after cleaning to the inspecting machine, for causing the detector head and the detection apparatus to inspect the coupling, and for causing the electrically actuated means for removing the coupling to remove the coupling from the inspecting machine after the detection step, said discharge means functioning after the electrically actuated means has removed the coupling from the inspecting machine.

3. A machine for successively cleaning, inspecting and sorting pipe couplings and the like comprising, in combination, a cleaning machine for cleaning the outer surface of the coupling, electrically actuated means for delivering couplings one at a time to the cleaning machine, an inspecting machine having an electronic flaw detecting apparatus for detecting imperfections in the cleaned coupling and including a detector head electrically connected to the detecting apparatus and adapted to scan the outer surface of the coupling, means for automatically transferring couplings from the cleaning machine to the inspecting machine, electrically actuated means operatively associated with said inspecting machine and serving to remove inspected couplings from said inspecting machine, discharge means operatively associated with the inspecting machine and electrically actuated by said detecting apparatus for separating a defective coupling from the remaining couplings when the detecting apparatus locates an imperfection while scanning the coupling, and electrical control means for operating the discharge means connected to the detecting apparatus, means for causing the said means for delivering couplings to deliver a coupling to the cleaning machine, for causing the cleaning machine to clean the coupling, for causing the means for transferring couplings to transfer the coupling from the cleaning machine after cleaning to the inspecting machine, for causing the detector head and the detection apparatus to inspect the coupling, and for causing the electrically actuated means for removing the coupling to remove the coupling from the inspecting machine after the detection step, said discharge means functioning after the electrically actuated means has removed the coupling from the inspecting machine.

4. A machine for successively cleaning, inspecting and sorting pipe couplings and the like comprising, in combination, a cleaning machine for cleaning the outer surface of the coupling, pneumatically actuated means for delivering couplings one at a time to the cleaning machine, an inspecting machine having an electronic flaw detecting apparatus for detecting imperfections in the coupling and including a detector head electrically connected to the detecting apparatus and adapted to scan the outer surface of the coupling, pneumatically actuated means for automatically transferring couplings from the cleaning machine to the inspecting machine after the coupling has been cleaned by the cleaning machine, pneumatically actuated means for separating a coupling found to be defective by the detecting apparatus from the remaining couplings when the detecting apparatus locates an imperfection while scanning the coupling, and electrical control means for controlling the cleaning machine and the inspecting machine and for successively energizing each of the aforesaid pneumatically actuated means and thereby operating the said delivering means, cleaning machine, inspecting machine, transfer means and discharge means.

5. A machine for successively cleaning, inspecting and sorting pipe couplings and the like comprising a cleaning machine having spaced parallel rolls for supporting the coupling, drive means for turning the rolls and the coupling, a rotary cleaner adapted to engage and clean the couplngs while being rotated by the rolls, and means for removing the coupling from the rolls after cleaning, feed means for delivering couplings one at a time to the cleaning machine, said cleaning of the coupling taking place after the delivery of a coupling by the feed means, an inspecting machine including a pair of spaced parallel rolls for supporting a coupling, a drive means for the rolls for turning the rolls and the coupling, an electronic flaw detecting apparatus and including a detector head therefor, and means for moving the detector head along the outer surface of the coupling as it is turned on the rolls to scan the coupling, means for transferring couplings from the cleaning machine to the inspecting machine, said means for transferring receiving the coupling from the means for removing the coupling from the rolls after cleaning, means operatively associated with the inspecting machine for removing the couplings from the inspecting machine rolls, said removal taking place after the coupling is scanned, and discharge means operatively associated with the inspecting machine and electrically actuated by said detecting apparatus for separating a defective coupling from the remaining couplings after they are removed from the inspecting machine when the detecting apparatus locates an imperfection while scanning the coupling.

6. A machine for successively cleaning, inspecting and sorting pipe couplings and the like comprising a cleaning machine having spaced parallel rolls for supporting the coupling, drive means for turning the rolls and the coupling, a rotary cleaner adapted to engage and clean the couplings while being rotated by the rolls, and means for removing the coupling from the rolls after cleaning, feed means for delivering couplings one at a time to the cleaning machine, said cleaning of the coupling taking place after the delivery of the coupling to the cleaning machine, an inspecting machine including a pair of spaced parallel rolls for supporting a coupling, and drive means for the rolls for turning the rolls and the coupling, an electronic flaw detecting apparatus and including a detector head therefor, and means for moving the detector head along the outer surface of the coupling as it is turned on the rolls to scan the coupling, means for transferring couplings from the cleaning machine to the inspecting machine, said transfer taking place after the cleaning operation, means operatively associated with said inspecting machine for removing the coupling from the inspecting machine rolls, said removal taking place after the scanning of the coupling, and discharge means operatively associated with said inspecting machine and electrically actuated by said detecting apparatus for separating a defective coupling from the remaining couplings after the coupling has been removed from the inspecting machine rolls by the removing means when the detecting apparatus locates an imperfection while scanning the coupling, said feed means, cleaning machine, inspecting machine, transfer means, removing means and discharging means being selectively energizable, and electric control means for successively controlling the actuation of the said cleaning machine, the said feed means, the said inspecting machine, the said transfer means, the said removing means and the said discharge means to automatically clean, inspect and sort couplings which are delivered to the machine.

7. A machine for successively cleaning, inspecting and sorting pipe couplings and the like comprising a cleaning machine having spaced parallel rolls for supporting the coupling, drive means for turning the rolls and the coupling, a rotary cleaner adapted to engage and clean the couplings while being rotated by the rolls, and means for removing the coupling from the rolls after cleaning, feed means for delivering couplings one at a time to the cleaning machine, said cleaning operation taking place after the feed means delivers a coupling to the cleaning machine, an inspecting machine including a pair of spaced parallel rolls for supporting a coupling, and drive means for the rolls for turning the rolls and the coupling, an electronic flaw detecting apparatus and including a detector head therefor, and means for moving the detector head along the outer surface of the coupling as it is turned on the rolls to scan the coupling, means operatively associated with the cleaning machine for transferring couplings from the removing means of the cleaning machine to the inspecting machine, said transfer taking place after the cleaning operation is completed, means operatively associated with the inspecting machine for removing the coupling from the inspecting machine rolls, said removal taking place after the scanning operation is completed, and discharge means operatively associated with said inspecting machine and electrically actuated by said detecting apparatus for separating a defective coupling from the remaining couplings after the coupling is removed from the inspecting machine by the removing means when the detecting apparatus locates an imperfection while scanning the coupling, and electrical control circuit means for connecting the detecting apparatus with the discharge means.

8. A machine for successively cleaning, inspecting and sorting pipe couplings and the like comprising a cleaning machine having spaced parallel rolls for supporting the coupling, drive means for turning the rolls and the coupling, a rotary cleaner adapted to engage and clean the couplings while being rotated by the rolls, feed means for delivering couplings one at a time to the cleaning machine, the cleaning operation taking place after the feed means delivers the coupling to the said machine, an inspecting machine including a pair of spaced parallel rolls for supporting a coupling, means for transferring a coupling from the cleaning machine to the inspection machine after the coupling has been cleaned, and drive means for the rolls of the inspecting machine for turning the rolls and the coupling, an electronic flaw detecting apparatus and including a detector head therefor, and means for moving the detector head along the outer surface of the coupling as it is turned on the rolls to scan the coupling, means for removing the coupling from the inspecting machine rolls after the scanning operation, discharge means for separating a defective coupling from the remaining couplings when the detecting apparatus locates an imperfection while scanning the coupling, said discharge means receiving the coupling from the removing means, said feed means, cleaning machine, inspection machine, transfer means, removing means and discharging means being selectively energized, and electrical control means for successively controlling the actuation of the said cleaning machine, the said feed means, the said inspecting machine, the said transfer means, the said removing means and the said discharge means to automatically clean, inspect and sort couplings which are delivered to the machine, and electrical control circuits connected to the detecting apparatus and to the electrical control means for operating the discharge means.

9. A machine for successively cleaning, inspecting and sorting pipe couplings and the like comprising cleaning machine means for cleaning the outer surface of the coupling, and inspecting machine means having a flaw detecting device for detecting imperfections in the couplings, each of the said machines having two spaced drive rolls for supporting couplings and drive means for turning the rolls and the couplings, the said rolls extending from the front to the rear of the machine for turning the couplings about the longitudinal axis thereof, means for feeding couplings to the drive rolls of the cleaning machine comprising a first inclined chute for permitting the couplings to roll from the feed end of the machine to the cleaning machine rolls, means for transferring couplings from the cleaning machine to the inspecting machine comprising a second inclined chute for permitting the couplings to roll from the rolls of the cleaning machine to the rolls of the inspecting machine, means for lifting couplings from the cleaning machine rolls to the feed end of the second inclined chute, said lifting means functioning after the couplings are cleaned, means for discharging couplings from the inspecting machine comprising a third inclined chute having spaced parallel side boards for permitting the couplings to roll from the inspecting machine to a container, and means for lifting couplings from the inspecting machine drive rolls to the feed end of the said third chute, said lifting means functioning after the inspection of the coupling, and means for separating defective couplings from the acceptable couplings comprising a defective coupling conveyor, and means actuated by said flaw detecting device when a defective coupling is in the inspecting machine for lifting the defective couplings from the third chute to the defective coupling conveyor as they pass down the chute.

10. The invention in accordance with claim 9, in which the drive rolls of the inspecting machine are adjustable, there are longitudinal ways at either side of the rolls of the inspecting machine and supports slidable on said ways and connected to the drive rolls of the inspecting machine for adjusting the rolls to accommodate couplings of different diameters.

11. The invention in accordance with claim 10, in which the said means for lifting couplings from the cleaning machine rolls is supported by the second inclined chute and the means for lifting defective couplings is supported from the third chute.

12. The invention in accordance with claim 9, in which the said chutes have spaced parallel side boards, there are adjustable screw means on the outside of the side boards at the front and back of the machine and spaced along the length of the chutes, and there is a hand wheel and means coupling the said screw means for simultaneously adjusting the screw means to adjust the side boards equally about a center position to accommodate couplings of any desired length and centering the couplings on the drive rolls.

13. A machine for successively cleaning, inspecting and sorting pipe couplings and the like comprising a cleaning machine for the couplings having a cleaner head and pneumatic actuator means for lowering and raising the cleaner head, elevator means including a pneumatic actuator for delivering couplings one at a time to the cleaning machine while the head is in the raised position, said head serving to clean a coupling in the cleaning machine when said head is in its lowered position, an inspecting machine having means including an inspector head and a pneumatic actuator for lowering and raising the inspector head, said machine receiving and discharging successive couplings when the inspector head is raised, pneumatic means for transferring couplings one at a time after being cleaned from the cleaning machine to the inspecting machine while the cleaner head is raised, discharge means electrically connected to the inspector head and including a pneumatic actuator for separating from the remaining couplings, a coupling found to be defective by said inspecting machine, and means for transferring couplings from the inspecting machine after being inspected thereby to the discharge means including a pneumatic actuator for removing couplings from the inspecting machine while the inspector head is raised, a solenoid operated valve for each of the said actuators and electrical control circuits connected to the said valves for operating the actuators in timed sequence to pass successive couplings through the machine.

14. The invention in accordance with claim 13, in which the said electrical control circuits include a plurality of switches, at least one switch being associated with each of the said actuators and adapted to be engaged by a coupling for operatively actuating the associated valve.

15. The invention in accordance with claim 13, in which the said electrical control circuits include a plurality of switches, at least one switch being associated with each of the said actuators and adapted to be engaged by a coupling for operatively actuating the associated valve, a switch associated with the said cleaner head and actuated by the cleaner head when the cleaner head is retracted to discharge couplings from the cleaning machine, and a switch associated with the inspector head and operated by the inspector head when the inspector head is retracted for discharging couplings from the inspecting machine.

16. The invention in accordance with claim 13, in which said elevator means lifts a coupling into a position to roll into the cleaning machine and includes a switch controlling said pneumatic actuator and a pivoted member adapted to be engaged by the end of a coupling to actuate the switch when the coupling is in position over the elevator.

17. The invention in accordance with claim 13, in which the said electrical control circuits include a switch operated by the cleaner head, the said switch operating the elevator means when the cleaner head has been raised and the cleaning machine is prepared to receive a succeeding coupling.

18. The invention in accordance with claim 17, in which said electrical control circuits include said cleaner head switch and said pneumatic means for transferring includes a pneumatic actuator and a valve associated with the actuator for removing couplings from the cleaning machine to operate the actuator and discharge couplings from the cleaning machine when the cleaning head is raised, said cleaner head switch controlling said valve.

19. The invention in accordance with claim 13, in which the said means for transferring couplings from the cleaning machine to the inspecting machine has a switch adapted to be actuated by the couplings as they pass through the transfer means, and electric circuits connected to the switch and to the valve associated with the actuator for the inspector head for lowering the inspector head when a coupling is transferred to the inspecting machine, saide switch and electric circuits form part of the electrical control circuits.

20. The invention in accordance with claim 13, in which the said means for transferring couplings from the cleaning machine to the inspecting machine has a switch adapted to be actuated by the couplings, electrical circuits connected to the switch and to the valve associated with the actuator for the inspector head for lowering the inspector head when a coupling is transferred to the inspecting machine, the said means for transferring couplings from the inspecting machine to the discharge means having a switch adapted to be actuated by the couplings as they pass through the transfer means, and electric circuits connected to the first-named electric circuits and the last-named switch for permitting a succeeding coupling to be transferred to the inspecting machine only after the preceding coupling has been removed, said switch and electric circuits form part of the electrical control circuits.

21. The invention in accordance with claim 13, in which the said discharge means has a switch adapted to be actuated by the couplings as they enter the discharge means, a first electric circuit including the said switch and the valve associated with the actuator for separating defective couplings, and a second electric circuit connected to the inspector head controlling the first electrical circuit for rendering the first-named circuit operative only for defective couplings, said first and second electrical circuits are part of the electrical control circuits.

22. An inspecting machine for pipe couplings and the like comprising, in combination, two spaced parallel rolls for supporting a pipe coupling and drive means for turning the rolls and the coupling, a movable carrier disposed adjacent the pipe coupling, an electrical detector device mounted on the carrier for traversing the outer surface of the coupling, and means for moving the carrier along the length of the coupling as the coupling is turned to scan the coupling with the detector device, and movable support means for the carrier and an actuator therefor for moving the said carrier toward the coupling to bring the detector device into engagement with the outer surface of the coupling and away from the coupling to permit couplings to be placed on the rolls for inspection and removed from the rolls after inspection.

23. An inspecting machine for pipe couplings and the like comprising, in combination, two spaced parallel rolls for supporting a pipe coupling and drive means for turning the rolls and the coupling, a movable carrier disposed adjacent the pipe coupling, an electrical detector device mounted on the carrier for traversing the outer surface of the coupling, and means for moving the carrier along the length of the coupling as the coupling is turned to scan the coupling with the detector device, and movable support means for the carrier and an actuator therefor for moving the said carrier toward the coupling to bring the detector device into engagement with the outer surface of the coupling and away from the coupling to permit couplings to be placed on the rolls for inspection and removed from the rolls after inspection, and means operable when the carrier is away from the coupling to discharge the coupling from the rolls when the inspection is completed.

24. An inspecting machine for pipe couplings and the like comprising a drive roll head having two spaced parallel drive rolls for supporting a pipe coupling and drive means for turning the rolls and the coupling, two vertical ways supported above the rolls and an inspector head arranged to slide on the ways, a detector head connected to the inspector head and an electronic flaw inspecting device connected to the detector head, and means for moving the detector head along the center of the coupling to scan the coupling as it turns on the rolls, means sliding the inspector head on the ways for lowering the inspector head to bring the detector head into contact with the outer surface of the coupling and for retracting the inspector head to feed couplings to and from the drive rolls, means for lifting couplings from the drive rolls after being inspected and discharge means operatively connected to and actuated by the electronic flaw inspecting device to separate the defective couplings from the acceptable couplings after discharge of the couplings from said drive rolls.

25. The invention in accordance with claim 24, in which the said drive roll head comprises two ways, two drive rolls, a support member for each of the rolls carried on the ways, a lead screw having oppositely directed threads engaged with threads on the said members and a hand wheel for turning the said lead screw to adjust the drive rolls equally about a center position to accommodate couplings of different diameters.

26. The invention in accordance with claim 25, in which the said drive roll head has a third way perpendicular to the said two ways, two guide roll supports mounted upon and adapted to slide along the said third way and two vertical guide rolls on the supports, a lead screw having oppositely directed screw threads engaged with threads on the guide roll supports, and a hand wheel for turning the lead screw to adjust the guide rolls equally about a center position to accommodate couplings of different lengths.

27. The invention in accordance with claim 24, in which the said inspector head comprises a slide member directed along the axis of rotation of the coupling and the said means for moving the detector head comprises two pulleys near the opposite ends of the slide member, an idler pulley and a belt carried by all the pulleys, a carrier for the detector head mounted on the slide member and attached to the belt, and a drive motor connected to one of said two pulleys for moving the carrier and the detector head along the slide member to cause the detector head to scan the coupling as it turns on the drive rolls.

28. The invention in accordance with claim 27, including a slip clutch coupling the said motor to one of the said pulley and two stops for the carrier on the slide member whereby the head may be moved along the slide member to scan the coupling and be stopped at a predetermined position at the end of the coupling.

29. The invention in accordance with claim 28 in which the said stop members are arranged to slide on the slide member, a lead screw carrying the said stop members having oppositely directed screw threads engaged with threads on the stop members and a hand wheel for turning the lead screw to adjust the lateral position of the stops equally about a center position whereby couplings of different lengths may be scanned according to the said predetermined pattern.

30. An inspecting machine for pipe couplings and the like comprising a drive roll head having two spaced parallel drive rolls for supporting a pipe coupling and drive means for turning the rolls and the coupling, two vertical ways supported above the rolls and an inspector head arranged to slide in the ways, a detector head connected to the inspector head and an electronic flaw detecting device connected to the detector head, and means for moving the detector head along the center of the coupling to scan the coupling as it turns on the rolls, means sliding the inspector head on the ways for lowering the inspector head to bring the detector head into engagement with the outer surface of the coupling and for retracting the inspector head to feed couplings to and from the drive rolls including a pneumatic actuator having a movable member, means connecting the movable member of the actuator to the inspector head and two stops for limiting the movement of the said movable member, means for lifting couplings from the drive rolls after being scanned and comprising an elevator and a pneumatic actuator for the elevator, and discharge means comprising conveying means, an elevator and a pneumatic actuator for the elevator operatively associated with said detecting device for separating the defective couplings from the acceptable couplings, a solenoid operated valve for each of said actuators, and electrical control means connected to the said valves for operating the actuators to pass successive couplings through the machine, said valve controlling the actuator of the discharge means also being controlled by the detecting device.

31. The invention in accordance with claim 30, in which one of the said stops is an upper stop to hold the inspector head when the detector head engages the outer surface of the coupling, and in which the said means for moving the detector head comprises a drive motor, an electrical switch on said upper stop, and an electric circuit means including said switch and said drive motor to move the detector head and scan the coupling when the detector head is brought into engagement with the coupling.

32. The invention in accordance with claim 31, in which the said electric circuit means includes delay means for permitting the coupling to be turned through at least one revolution after the switch on the lower stop has been actuated before the drive motor is started.

33. The invention in accordance with claim 31, in which the said circuit includes two limit switches connected to the detector head for starting the detector head at one end of the coupling and stopping the detector head when it arrives at the remaining end of the coupling.

34. The invention in accordance with claim 30, in which one of the said stops is an upper stop to hold the inspector head when the detector head engages the outer surface of the coupling and in which the said means for moving the detector head comprises a drive motor, an electrical switch on said upper stop, an electrical circuit means including said switch and said drive motor, two limit switches on the inspector head and adapted to be actuated by the detector head at the ends of the coupling, said limit switches being included in said electrical circuit means and serving to start the drive motor when the detector head is at one end of a coupling and for stopping the drive motor when the detector head reaches the other end of the coupling when the electrical switch on the upper stop is closed.

35. The invention in accordance with claim 34, in which the said electric circuit means includes delay means connected to the said limit switches for allowing the coupling to turn through at least one full turn after the detector head has been brought into engagement with the outer surface of the coupling at either end of the coupling.

36. The invention in accordance with claim 34, in which the said two limit switches have two stop members arranged to slide about a center position, a lead screw carries the said stop members and has oppositely directed screw threads engaged with corresponding screw threads on the members and there is a hand wheel for turning the lead screw to adjust the position of the stops equally about the center position whereby the limit switches are effective for couplings of different lengths.

37. The invention in accordance with claim 30, in which one of the said stops is a lower stop for holding the inspector head when the detector head has been retracted from engagement with the outer surface of the coupling and an upper stop for holding the inspector head when the detector head is in coupling scanning position, said means for moving the detector head comprises a drive motor, an electrical switch on said upper stop, a switch on the lower stop adapted to be actuated by the actuator when the inspector head has been retracted, two limit switches on the inspector head adapted to be actuated by the detector head at the ends of the coupling, and electric circuit means connected to the upper stop switch, to the said limit switches on the inspector head, and to the solenoid valve associated with the inspector head actuator for stopping the drive motor at the end of the coupling and operating the valve to retract the inspector head, said electric circuit means forming a portion of the electric control means.

38. The invention in accordance with claim 37, in which the said electric circuit means includes delay means connected to the said limit switches for allowing the coupling to turn through at least one full turn after the drive motor has been stopped before the inspector head is retracted.

39. A cleaning machine for pipe couplings and the like comprising a frame, two longitudinal ways supported by the frame, a drive roll head comprising a frame arranged to slide on the ways, two shafts supported transversely of the ways by the frame and parallel one with the other, and drive rolls on the shafts for supporting a pipe coupling, a motor carried by the frame and means coupling the motor to at least one of the rolls for turning the rolls and and the coupling, two vertical ways supported by the drive roll head and a cleaner head arranged to slide on the vertical ways, a rotary brush on the cleaner head and a motor for turning the cleaner brush, a first inclined chute carried by the ways at the feed side of the rolls for permitting pipe couplings to roll from the feed end of the machine to the rolls for cleaning, and a second inclined chute carried by the ways at the discharge side of the rolls for permitting couplings to roll away from the drive rolls after cleaning, and discharge means for lifting couplings from the rolls to the feed end of the second inclined chute.

40. The invention in accordance with claim 39, the discharge end of the first chute and the feed end of the second chute being connected together by an adjustable means for adjusting the spacing between the ends of the chutes to accommodate different diameter couplings on the rolls and to position the chutes on the ways.

41. The invention in accordance with claim 39 and including means for lowering the cleaner head to bring the cleaner brush into engagement with the outer surface of the coupling to clean the coupling and for retracting the cleaner head to feed successive couplings to the rolls for cleaning and for discharging the couplings from the rolls after cleaning.

42. The invention in accordance with claim 41 and including means for adjusting the said lowering means to accommodate couplings of different diameters.

43. The invention in accordance with claim 41, said lowering means comprising a pneumatic actuator supported by the vertical ways, a movable member of the actuator connected to the cleaner head and adjustable stop means for controlling the lower extent of travel of the cleaner head.

44. The invention in accordance with claim 43, the said adjustable stop means comprising a threaded sleeve surrounding the said movable member, a rotatable member for supporting the sleeve and a collar on the movable member above the sleeve adapted to engage the sleeve to stop the cleaner head, and means for retracting the cleaner head to the same position comprising a collar on the movable member and a fixed stop for the collar.

45. The invention in accordance with claim 44, the said fixed stop having an electric switch associated therewith and adapted to be actuated by the last-named collar on the movable member for controlling operations upon the coupling after the cleaner head is retracted.

46. The invention in accordance with claim 39, the said inclined chutes having spaced parallel side boards, adjustable screw means on the outside of the side boards at the front and back of the machine and spaced along the length thereof, a hand wheel and means coupling the said screw means for simultaneously adjusting the screw means to adjust the side boards equally about a center position to accommodate couplings of any desired length and centering the couplings on the drive rolls.

47. The invention in accordance with claim 39, the said cleaner head including a water supply means, a nozzle and a solenoid valve adapted to be operated in conjunction with the cleaner head to clean the cleaner head brush.

48. Apparatus for inspecting metallic couplings comprising means for supporting and rotating a metallic coupling, a detecting device to detect defects in said coupling, means for activating said detecting device, means for moving said energized detecting device in defect detecting position longitudinally along the coupling from one end to the other end thereof and means for delaying movement of said device at one end of said coupling while the coupling is being rotated thru one turn.

49. Apparatus for inspecting metallic couplings comprising means for supporting and rotating a metallic coupling, a detecting device to detect defects in said coupling, means for activating said detecting device, means for moving said energized detecting device in defect detecting position longitudinally along the coupling from one end to the other end thereof and means for delaying movement of said device at each end of said coupling while the coupling is being rotated thru one turn.

References Cited in the file of this patent

UNITED STATES PATENTS

| 1,628,767 | Brown | May 17, 1927 |
| 2,221,570 | Brace et al. | Nov. 12, 1940 |
| 2,357,512 | Gaiser | Sept. 5, 1944 |
| 2,439,184 | Parvin | Apr. 6, 1948 |
| 2,563,254 | Lewis | Aug. 7, 1951 |
| 2,566,767 | Hunt | Sept. 5, 1951 |
| 2,651,412 | Aller | Sept. 8, 1953 |
| 2,751,617 | McLaggan | June 26, 1956 |